US012578835B2

(12) United States Patent
Rockel et al.

(10) Patent No.: US 12,578,835 B2
(45) Date of Patent: ***Mar. 17, 2026

(54) DEVICES, METHODS, AND GRAPHICAL USER INTERFACES FOR INTERACTING WITH THREE-DIMENSIONAL ENVIRONMENTS

(71) Applicant: Apple Inc., Cupertino, CA (US)

(72) Inventors: Philipp Rockel, San Francisco, CA (US); Jeffrey M. Faulkner, Sisters, OR (US); Israel Pastrana Vicente, Spring, TX (US); Wesley M. Holder, Union City, CA (US); Nicholas W. Henderson, San Carlos, CA (US); Robert T. Tilton, Los Angeles, CA (US); Richard R. Dellinger, San Jose, CA (US); Stephen O. Lemay, Palo Alto, CA (US); William A. Sorrentino, III, Mill Valley, CA (US); Giancarlo Yerkes, San Francisco, CA (US); Pedro Mari, Santa Cruz, CA (US); Peter D. Anton, Portola Valley, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/097,136

(22) Filed: Jan. 13, 2023

(65) Prior Publication Data

US 2023/0168788 A1 Jun. 1, 2023

Related U.S. Application Data

(63) Continuation of application No. 17/483,717, filed on Sep. 23, 2021, now Pat. No. 11,567,625.

(Continued)

(51) Int. Cl.
| | |
|---|---|
| *G06F 3/048* | (2013.01) |
| *G06F 3/01* | (2006.01) |
| *G06F 3/04815* | (2022.01) |

(52) U.S. Cl.
CPC .......... *G06F 3/04815* (2013.01); *G06F 3/013* (2013.01); *G06F 3/017* (2013.01)

(58) Field of Classification Search
CPC ...... G06F 3/04815; G06F 3/013; G06F 3/017; G06F 3/012; G06F 3/167; G06F 3/011;
(Continued)

(56) References Cited

U.S. PATENT DOCUMENTS

| | | | | |
|---|---|---|---|---|
| 5,528,735 A | * | 6/1996 | Strasnick | .............. G06T 11/206 |
| | | | | 715/850 |
| 5,671,381 A | * | 9/1997 | Strasnick | ............... G06T 15/20 |
| | | | | 715/848 |

(Continued)

FOREIGN PATENT DOCUMENTS

| | | |
|---|---|---|
| CN | 103180893 A | 6/2013 |
| CN | 105264480 A | 1/2016 |

(Continued)

OTHER PUBLICATIONS

Anonymous, "Micro-Gestures", https://web.archive.org/web/20190808194109/http://gestureml.org/doku.php/gestures/fusion/microgesture_index, Aug. 8, 2019, 5 pages.

(Continued)

*Primary Examiner* — Jordany Nunez
(74) *Attorney, Agent, or Firm* — Morgan, Lewis & Bockius LLP

(57) ABSTRACT

A system displays, via the first display generation component: a first view of a computer-generated three-dimensional environment, including a representation of a physical environment, and a representation of one or more projections of (Continued)

light. The representation of the one or more projections of light has an appearance that corresponds to a spatial relationship between first virtual content present in the computer-generated three-dimensional environment and the representation of the physical environment. The system displays animated changes of the representation of the one or more projections of light and displays alterations of an appearance of a representation of a first surface in the physical environment in accordance with the animated changes of the representation of the one or more projections of light.

30 Claims, 10 Drawing Sheets

Related U.S. Application Data

(60) Provisional application No. 63/082,918, filed on Sep. 24, 2020.

(58) Field of Classification Search
CPC .......... G06T 2219/2021; G06T 15/506; G06T 19/006; G06T 19/20
See application file for complete search history.

(56) References Cited

U.S. PATENT DOCUMENTS

| | | | | |
|---|---|---|---|---|
| 5,861,885 | A * | 1/1999 | Strasnick | G06T 19/003 |
| | | | | 715/850 |
| 6,480,210 | B1 * | 11/2002 | Martino | G06F 16/7335 |
| | | | | 715/848 |
| 6,771,294 | B1 * | 8/2004 | Pulli | G06F 3/011 |
| | | | | 715/764 |
| 7,834,846 | B1 * | 11/2010 | Bell | G03B 21/26 |
| | | | | 345/158 |
| 8,405,680 | B1 | 3/2013 | Cardoso Lopes et al. | |
| 8,446,288 | B2 * | 5/2013 | Mizushima | H04N 9/3185 |
| | | | | 340/568.1 |
| 8,797,321 | B1 * | 8/2014 | Bertolami | G06T 15/50 |
| | | | | 345/426 |
| 9,836,127 | B2 | 12/2017 | Jung | |
| 10,055,887 | B1 | 8/2018 | Gil et al. | |
| 10,261,595 | B1 | 4/2019 | Kin | |
| 10,262,036 | B2 * | 4/2019 | Paine | G06F 16/24569 |
| 10,354,449 | B2 * | 7/2019 | Todeschini | G06T 19/006 |
| 10,621,439 | B2 * | 4/2020 | Fu | G06T 11/60 |
| 10,725,308 | B1 | 7/2020 | Trail | |
| 11,086,475 | B1 * | 8/2021 | Ravasz | G06F 3/011 |
| 11,250,943 | B2 * | 2/2022 | Roig Munill | G06K 7/10722 |
| 11,354,852 | B2 * | 6/2022 | Evans | G06T 19/006 |
| 11,386,621 | B2 * | 7/2022 | Abdoo | F25D 29/00 |
| 11,436,828 | B1 * | 9/2022 | Little | G06Q 40/08 |
| 11,494,988 | B2 * | 11/2022 | Ben-Dor | G02B 27/017 |
| 2010/0241525 | A1 | 9/2010 | Aguera y arcas et al. | |
| 2010/0289664 | A1 * | 11/2010 | Mizushima | H04N 9/3194 |
| | | | | 340/691.6 |
| 2012/0047468 | A1 | 2/2012 | Santos et al. | |
| 2012/0113223 | A1 | 5/2012 | Hilliges et al. | |
| 2012/0326961 | A1 | 12/2012 | Bromer | |
| 2013/0050432 | A1 | 2/2013 | Perez et al. | |
| 2014/0282220 | A1 * | 9/2014 | Wantland | G06F 3/011 |
| | | | | 715/782 |
| 2015/0042679 | A1 | 2/2015 | Jarvenpaa | |
| 2015/0205484 | A1 | 7/2015 | Morishita et al. | |
| 2015/0248787 | A1 | 9/2015 | Abovitz et al. | |
| 2015/0312559 | A1 | 10/2015 | Ueno et al. | |
| 2016/0041619 | A1 | 2/2016 | Ishiwata et al. | |
| 2016/0313790 | A1 | 10/2016 | Clement et al. | |
| 2017/0343811 | A1 | 11/2017 | Mese et al. | |
| 2017/0345219 | A1 | 11/2017 | Holz | |
| 2018/0020312 | A1 | 1/2018 | Visser et al. | |
| 2018/0053337 | A1 | 2/2018 | Nakashima et al. | |
| 2018/0095636 | A1 * | 4/2018 | Valdivia | G06F 3/011 |
| 2018/0120944 | A1 | 5/2018 | Wang et al. | |
| 2018/0189354 | A1 * | 7/2018 | Paine | G06F 3/0304 |
| 2018/0300953 | A1 | 10/2018 | Kraver et al. | |
| 2018/0307303 | A1 | 10/2018 | Powderly et al. | |
| 2019/0026936 | A1 * | 1/2019 | Gorur Sheshagiri | |
| | | | | G06F 3/0304 |
| 2019/0026937 | A1 * | 1/2019 | Benoît | G06T 15/506 |
| 2019/0034765 | A1 | 1/2019 | Kaehler et al. | |
| 2019/0035124 | A1 | 1/2019 | Kapinos et al. | |
| 2019/0065027 | A1 * | 2/2019 | Hauenstein | G06F 3/0484 |
| 2019/0121517 | A1 | 4/2019 | Jackson et al. | |
| 2019/0221035 | A1 | 7/2019 | Clark et al. | |
| 2019/0236835 | A1 * | 8/2019 | Gorur Sheshagiri | G06F 3/017 |
| 2019/0362556 | A1 * | 11/2019 | Ben-Dor | G06F 3/167 |
| 2019/0394607 | A1 | 12/2019 | Laaksonen et al. | |
| 2020/0026922 | A1 | 1/2020 | Pekelny et al. | |
| 2020/0045298 | A1 * | 2/2020 | Kneale | G06T 15/506 |
| 2020/0082555 | A1 | 3/2020 | Iyer et al. | |
| 2020/0112711 | A1 | 4/2020 | Enriquez et al. | |
| 2020/0118341 | A1 * | 4/2020 | Ohashi | H04N 9/75 |
| 2020/0211285 | A1 * | 7/2020 | Abdoo | F25D 29/00 |
| 2020/0252739 | A1 | 8/2020 | Eronen et al. | |
| 2020/0258278 | A1 | 8/2020 | Mirhosseini et al. | |
| 2020/0273251 | A1 * | 8/2020 | Palos | G06T 7/70 |
| 2021/0034222 | A1 | 2/2021 | Brems et al. | |
| 2021/0081034 | A1 | 3/2021 | Olson et al. | |
| 2021/0117712 | A1 * | 4/2021 | Huang | G06F 40/126 |
| 2021/0233341 | A1 | 7/2021 | Hayes et al. | |
| 2021/0364809 | A1 | 11/2021 | Olson et al. | |
| 2022/0091723 | A1 | 3/2022 | Faulkner et al. | |
| 2022/0092862 | A1 * | 3/2022 | Faulkner | G06V 40/18 |
| 2022/0114811 | A1 * | 4/2022 | Kis | G06T 19/006 |
| 2022/0244835 | A1 | 8/2022 | Faulkner et al. | |
| 2022/0284684 | A1 * | 9/2022 | Abdoo | G06Q 30/0643 |
| 2022/0346888 | A1 * | 11/2022 | Luo | G16H 40/63 |
| 2023/0186578 | A1 | 6/2023 | Faulkner et al. | |
| 2023/0418432 | A1 | 12/2023 | Faulkner et al. | |
| 2025/0054253 | A1 | 2/2025 | Lemay et al. | |

FOREIGN PATENT DOCUMENTS

| | | |
|---|---|---|
| CN | 106937531 A | 7/2017 |
| CN | 107548470 A | 1/2018 |
| JP | 2015041126 A | 3/2015 |
| JP | 2018-077876 | 5/2018 |
| JP | 2022546502 A | 11/2022 |
| KR | 2018-0017227 A | 2/2018 |
| WO | WO 2013/180966 A1 | 12/2013 |
| WO | WO 2015/192117 A1 | 12/2015 |
| WO | WO 2019/046597 A1 | 3/2019 |
| WO | WO 2019/217163 A1 | 11/2019 |

OTHER PUBLICATIONS

Crasto, et al., "The Smart Bookshelf: A Study of Camera Projector Scene Augmentation of an Everyday Environment", 2005 Seventh IEEE Workshops on Applications of Computer Vision, Los Alamitos, CA USA, Jan. 5, 2005, 8 pages.

Butz et al., "Searchlight_A_Lightweight_Search_Function_for_ Pervasive_Environments" Springer-Verlag, Berlin/Heidelberg, Mar. 23, 2004, 3 pages.

Darzentas et al., "Designed to Thrill: Exploring the Effects of Multimodal Feedback on Virtual World Immersion", International Conference, ICB Proceedings; (Lecture Notes in Computer Science; Lect.notes Computer), Springer, Berlin, Heidelberg, Jul. 21, 2015, 30 pages.

Lang, "Microsoft is Adding Pass-through Video to Windows VR Headsets", http://www.roadtovr.com/microsoft-is-adding-pass-through-video-to-windows-vr-headsets, Jul. 27, 2018, 2 pages.

Li Ming et al., "ProFi Design and Evaluation of a Product Finder in a Supermarket Scenario", proceedings of the 16th ACM International Conference on Modeling, Analysis & Simultation of Wireless and Mobile Systems, New York NY, Sep. 8, 2013, 8 pages.

Lu et al., "Attributes of Subtle Cues for Facilitating Visual Search

(56)　　　　　References Cited

OTHER PUBLICATIONS in Augmented Reality", IEEE Transactions on Visualization and Computer Graphics, IEEE, USA, Mar. 21, 2014, 9 pages.

Microsoft HoloLens, "Gesture Input", https://www.youtube.com/watch?v=kwn9Lh0E_vU, Feb. 29, 2016, 3 pages.

Microsoft, "Introducing Instinctual Interactions", http://docs.microsoft.com/en-us/windows/mixed-reality/gestures, Apr. 11, 2019, 7 pages.

Mitsushita et al., "Interactive Bookshelf Surface for in Situ Book Searching and Storing Support", Proceedings of the 2nd Augmented Human International Conference, ACM, 2 Penn Plaza, Suite 701 New York NY 10121-0701, Mar. 13, 2011, 8 pages.

Soliman, "FingerInput: Capturing Expressive Single-Hand Thumb-to-Finger Microgestures" Proceedings of the 2018 ACM International Conference on Interactive Surfaces and Spaces, New York, Nov. 19, 2018, 4 pages.

Whitmire et al., DigiTouch: Reconfigurable Thumb-to-Finger Input and Text Extry on Head-Mounted Displayshttps://upicomplab.cs.washington.edu/pdfs/digitouch.pdf, Sep. 2017, 21 pages.

Youtube, "Envisioning the Future with Windows Mixed Reality", https://www.youtube.com/watch?v=2MqGrF6JaOM, Jun. 1, 2016, 4 pages.

Youtube, "Interactive Light Source Position Estimation for Augmented Reality with an RGB-D Camera", http://www.youtube.com/watch?v=1WHW4cOEe6c, Nov. 6, 2016, 3 pages.

Youtube, "Job Simulator Gameplay—Office Worker-HTC Vive", http://www.youtube.com/watch?v=jF6RzK50fDs, Apr. 6, 2016, 3 pages.

Office Action, dated Aug. 16, 2021, received in U.S. Appl. No. 17/030,200, 21 pages.

Notice of Allowance, dated Feb. 3, 2022, received in U.S. Appl. No. 17/030,200, 8 pages.

Office Action, dated Sep. 6, 2022, received in Indian Patent Application No. 202217011878, which corresponds with U.S. Appl. No. 17/030,200. 9 pages.

Notice of Allowance, dated Sep. 15, 2022, received in U.S. Appl. No. 17/483,717, 10 pages.

Office Action, dated Aug. 8, 2022, received in U.S. Appl. No. 17/483,722, 21 pages.

Invitation to Pay Additional Fees, dated Dec. 17, 2020, received in International Patent Application No. PCT/US2020/052640, which corresponds with U.S. Appl. No. 17/030,200, 18 pages.

International Search Report and Written Opinion, dated Feb. 8, 2021, received in International Patent Application No. PCT/US2020/052640, which corresponds with U.S. Appl. No. 17/030,200, 22 pages.

International Search Report and Written Opinion, dated Feb. 24, 2022, received in International Patent Application No. PCT/US2021/051976, which corresponds with U.S. Appl. No. 17/483,717, 57 pages.

International Search Report and Written Opinion, dated Mar. 14, 2022, received in International Patent Application No. PCT/US2021/052016, which corresponds with U.S. Appl. No. 17/483,722, 19 pages.

Notice of Allowance, dated Apr. 27, 2023, received in U.S. Appl. No. 17/727,627, 25 pages.

Office Action, dated Jun. 27, 2023, received in U.S. Appl. No. 18/107,375, 17 pages.

Office Action, dated Oct. 12, 2023, received in Australian Patent Application No. 2020351739, which corresponds with U.S. Appl. No. 17/030,200, 3 pages.

Final Office Action, dated Oct. 2, 2023, received in Japanese Patent Application No. 2022-513681, which corresponds with U.S. Appl. No. 17/030,200, 1 page.

Office Action, dated Dec. 20, 2023, received in Korean Patent Application No. 2022-7007798, which corresponds with U.S. Appl. No. 17/030,200, 5 pages.

Final Office Action, dated Oct. 10, 2023, received in U.S. Appl. No. 18/107,375, 23 pages.

Office Action, dated Mar. 6, 2023, received in Japanese Patent Application No. 2022-513681, which correspond with U.S. Appl. No. 17/030,200, 7 pages.

Certificate of Grant, dated May 23, 2024, received in Australian U.S. Appl. No. 17/030,200, which corresponds with U.S. Appl. No. 17/030,200, 3 pages.

Patent, dated Apr. 3, 2024, received in Japanese Patent Application No. 2022- 513681, which corresponds with U.S. Appl. No. 17/030,200, 7 pages.

Office Action, dated Jul. 18, 2024, received in European Patent Application No. 21799406.0, 10 pages.

Final Office Action, dated Apr. 22, 2024, received in U.S. Appl. No. 18/107,375, 9 pages.

Notice of Allowance, dated Jul. 16, 2024, received in U.S. Appl. No. 18/107,375, 9 pages.

Notice of Allowance, dated Jan. 23, 2024, received in Australian Patent Application No. 2020351739, which corresponds with U.S. Appl. No. 17/030,200, 3 pages.

Notice of Allowance, dated Mar. 4, 2024, received in Japanese Patent Application No. 2022-513681, which corresponds with U.S. Appl. No. 17/030,200, 2 pages.

Office Action, dated Feb. 16, 2024, received in U.S. Appl. No. 18/107,375, 23 pages.

Office Action, dated Apr. 29, 2024, received in Chinese Patent Application No. 202210375296X, which corresponds with U.S. Appl. No. 17/030,200, 2 pages.

Office Action, dated Jan. 4, 2025, received in Chinese Patent Application No. 202210375296X, which corresponds with U.S. Appl. No. 17/030,200, 2 pages.

Patent, dated Nov. 12, 2024, received in Japanese Patent Application No. 2023-315649, which corresponds with U.S. Appl. No. 17/483,722, 2 pages.

Office Action, dated Sep. 30, 2024, received in U.S. Appl. No. 18/244,864, 35 pages.

Notice of Allowance, dated Jan. 16, 2025, received in U.S. Appl. No. 18/244,864, 8 pages.

Notice of Allowance, dated Feb. 7, 2025, received in Japanese Patent Application No. 2024-013225, 2 pages.

Notice of Allowance, dated Aug. 22, 2024, received in Korean Patent Application No. 2022-7007798, which corresponds with U.S. Appl. No. 17/030,200, 5 pages.

Office Action, dated Jul. 29, 2024, received in Japanese Patent Application No. 2023-315649, which corresponds with U.S. Appl. No. 17/483,722, 4 pages.

Hideki et al, "FingerInput: Capturing Expressive Single-Hand Thumb-to-Finger Microgestures", Proceedings of the 2018 ACM International Conference on Interactive Surfaces and Spaces, Nov. 19, 2018, 11 pages.

Lang, "Leap Motion Virtual Wearbable AR Prototype is a Potent Glimpse at the Future of your Smartphone", https://wwwroadtovr.com.leap-motion-virtual-wearable-ar-prototype-glimpse-of-future-smartphone, Mar. 24, 2018, 5 pages.

Youtube, "Leap Motion Interaction Experiment: Shortcuts", https://www.youtube.com/watch?v=LFRKEmrzP8, Aug. 31, 2020, 2 pages.

Notice of Allowance, dated Apr. 23, 2025, received in Chinese Patent Application No. 202210375296X, which corresponds with U.S. Appl. No. 17/030,200, 5 pages.

Patent, dated Jul. 4, 2025, received in Chinese Patent Application No. 202210375296X, which corresponds with U.S. Appl. No. 17/030,200, 6 pages.

Office Action, dated Jul. 16, 2025, received in European Patent Application No. 20788956.9, which corresponds with U.S. Appl. No. 17/030,200, 12 pages.

Patent, dated Apr. 3, 2024, received in Korean Patent Application No. 2023-7008878, which corresponds with U.S. Appl. No. 17/483,722, 6 pages.

Office Action, dated Mar. 20, 2025, received in Australian Patent Application No. 2024202163, which corresponds with U.S. Appl. No. 17/727,627, 2 pages.

Office Action, dated Apr. 14, 2025, received in U.S. Appl. No. 19/056,609, 44 pages.

(56) References Cited

OTHER PUBLICATIONS

Grant Decision, dated Sep. 25, 2025, received in European Patent Application No. 21799406.0, which corresponds with U.S. Appl. No. 17/483,722, 4 pages.

Office Action, dated Oct. 27, 2025, received in Japanese Patent Application No. 2024-196018, which corresponds with U.S. Appl. No. 18/929,253, 7 pages.

Extended European Search Report, dated Dec. 5, 2025, received in European Patent Application No. 25205746.8, which corresponds with U.S. Appl. No. 18/929,253, 12 pages.

* cited by examiner

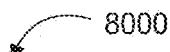

8000

8002 Display, via the first display generation component:

a first view of a first computer-generated three-dimensional environment, wherein the first view of the first computer-generated three-dimensional environment includes a representation of a respective portion of a physical environment, and a first representation of one or more projections of light in a first portion of the first computer-generated three-dimensional environment, wherein the appearance of the first representation of the one or more projections of light indicates a spatial relationship between a virtual assistant present in the first computer-generated three-dimensional environment and the representation of the respective portion of the physical environment in the first computer-generated three-dimensional environment 8004 While displaying the first view of the first computer-generated three-dimensional environment and the first representation of the one or more projections of light, detect, from a first user, a query directed to the virtual assistant 8006 In response to detecting the query directed to the virtual assistant:

8008 Display animated changes of the first representation of the one or more projections of light in the first portion of the first computer-generated three-dimensional environment, wherein displaying the animated changes include displaying a second representation of the one or more projections of light that is focused on a first sub-portion of the first portion of the first computer-generated three-dimensional environment 8010 After displaying the animated changes of the first representation of the one or more projections of light, display content responding to the query at a position corresponding to the first sub-portion of the first portion of the first computer-generated three-dimensional environment

Figure 8

DEVICES, METHODS, AND GRAPHICAL USER INTERFACES FOR INTERACTING WITH THREE-DIMENSIONAL ENVIRONMENTS

RELATED APPLICATIONS

This application is a continuation of U.S. application Ser. No. 17/483,717, filed Sep. 23, 2021, which claims priority to U.S. Provisional Patent Application 63/082,918, filed Sep. 24, 2020, which are both incorporated by reference in its entirety.

TECHNICAL FIELD

This disclosure relates generally to computer systems with a display generation component and one or more input devices that provide computer generated reality (CGR) experiences, including but not limited to electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects include digital images, video, text, icons, and control elements such as buttons and other graphics.

But methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious and error-prone, create a significant cognitive burden on a user, and detract from the experience with the virtual/augmented reality environment. In addition, these methods take longer than necessary, thereby wasting energy. This latter consideration is particularly important in battery-operated devices.

SUMMARY

Accordingly, there is a need for computer systems with improved methods and interfaces for providing computer-generated experiences to users that make interaction with the computer systems more efficient and intuitive for a user. Such methods and interfaces optionally complement or replace conventional methods for providing computer-generated reality experiences to users. Such methods and interfaces reduce the number, extent, and/or nature of the inputs from a user by helping the user to understand the connection between provided inputs and device responses to the inputs, thereby creating a more efficient human-machine interface. Such methods and interfaces also improve the user's experience, e.g., by reducing mistakes, interruptions, and time delays, when the user is engaged in the virtual reality experience and/or the mixed reality experience provided by the computer systems.

The above deficiencies and other problems associated with interfaces for providing computer generated experiences are reduced or eliminated by the disclosed computer systems and methods. In particular, when interacting with a computer-generated three-dimensional environment, the user may desire some assistance, e.g., in resolving queries and/or performing operations in the three-dimensional environment. Accordingly, in some embodiments, systems and methods for enabling interaction with a virtual assistant within the three-dimensional environment are disclosed, where the virtual assistant provides information in response to detecting input from the user (e.g., verbal communications, gaze, gestures, touch inputs, etc.) that corresponds to a request to interact with the virtual assistant.

In accordance with some embodiments, a method is performed at a computing system including a first display generation component and one or more input devices. The method includes displaying a first view of a first computer-generated three-dimensional environment. The first view of the first computer-generated three-dimensional environment includes a representation of a respective portion of a physical environment, and a first representation of one or more projections of light in a first portion of the first computer-generated three-dimensional environment. The first representation of the one or more projections of light has an appearance that indicates a spatial relationship between a virtual assistant present in the first computer-generated three-dimensional environment. The method further includes, while displaying the first view of the first computer-generated three-dimensional environment and the first representation of the one or more projections of light, detecting, from a first user, a query directed to the virtual assistant. In response to detecting the query directed to the virtual assistant, displaying animated changes of the first representation of the one or more projections of light in the first portion of the first computer-generated three-dimensional environment, wherein displaying the animated changes include displaying a second representation of the one or more projections of light that is focused on a first sub-portion of the first portion of the first computer-generated three-dimensional environment. The method further includes, after displaying the animated changes of the first representation of the one or more projections of light, displaying content responding to the query at a position corresponding to the first sub-portion of the first portion of the first computer-generated three-dimensional environment.

In accordance with some embodiments, a computer system includes or is in communication with a display generation component (e.g., a display, a projector, a head-mounted display, etc.), one or more input devices (e.g., one or more cameras, a touch-sensitive surface, optionally one or more sensors to detect intensities of contacts with the touch-sensitive surface), optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a non-transitory computer readable storage medium has stored therein instructions, which, when executed by a computer system with a display generation component, one or more input devices (e.g., one or more cameras, a touch-sensitive surface, optionally one or more sensors to detect intensities of contacts with the touch-sensitive surface), and optionally one or more tactile output generators, cause the device to perform or cause performance of the operations of any of the methods described herein. In accordance with some embodiments, a graphical user interface on a computer system with a display generation component, one or more input devices (e.g., one or more cameras, a touch-sensitive surface, optionally one or more sensors to detect intensities of contacts with the touch-sensitive surface), optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, a computer system includes: a display generation component, one or more input devices (e.g., one or more cameras, a touch-sensitive surface, optionally one or more sensors to detect intensities of contacts with the touch-sensitive surface), and optionally one or more tactile output generators; and means for performing or causing performance of the operations of any of the methods described herein. In accordance with some embodiments, an information processing apparatus, for use in a computer system with a display generation component, one or more input devices (e.g., one or more cameras, a touch-sensitive surface, optionally one or more sensors to detect intensities of contacts with the touch-sensitive surface), and optionally one or more tactile output generators, includes means for performing or causing performance of the operations of any of the methods described herein.

Thus, computer systems with display generation components are provided with improved methods and interfaces for interacting with a three-dimensional environment and facilitating the user's user of the computer systems when interacting with the three-dimensional environment, thereby increasing the effectiveness, efficiency, and user safety and satisfaction with such computer systems. Such methods and interfaces may complement or replace conventional methods for interacting with a three-dimensional environment and facilitating the user's use of the computer systems when interacting with the three-dimensional environment.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 1 is a block diagram illustrating an operating environment of a computer system for providing CGR experiences in accordance with some embodiments.

FIG. 8 is a flowchart of a method of displaying and moving a representation of virtual illumination associated with a virtual assistant in a three-dimensional environment in response to user interaction with the virtual assistant, in accordance with some embodiments.

DESCRIPTION OF EMBODIMENTS

Figure 2:
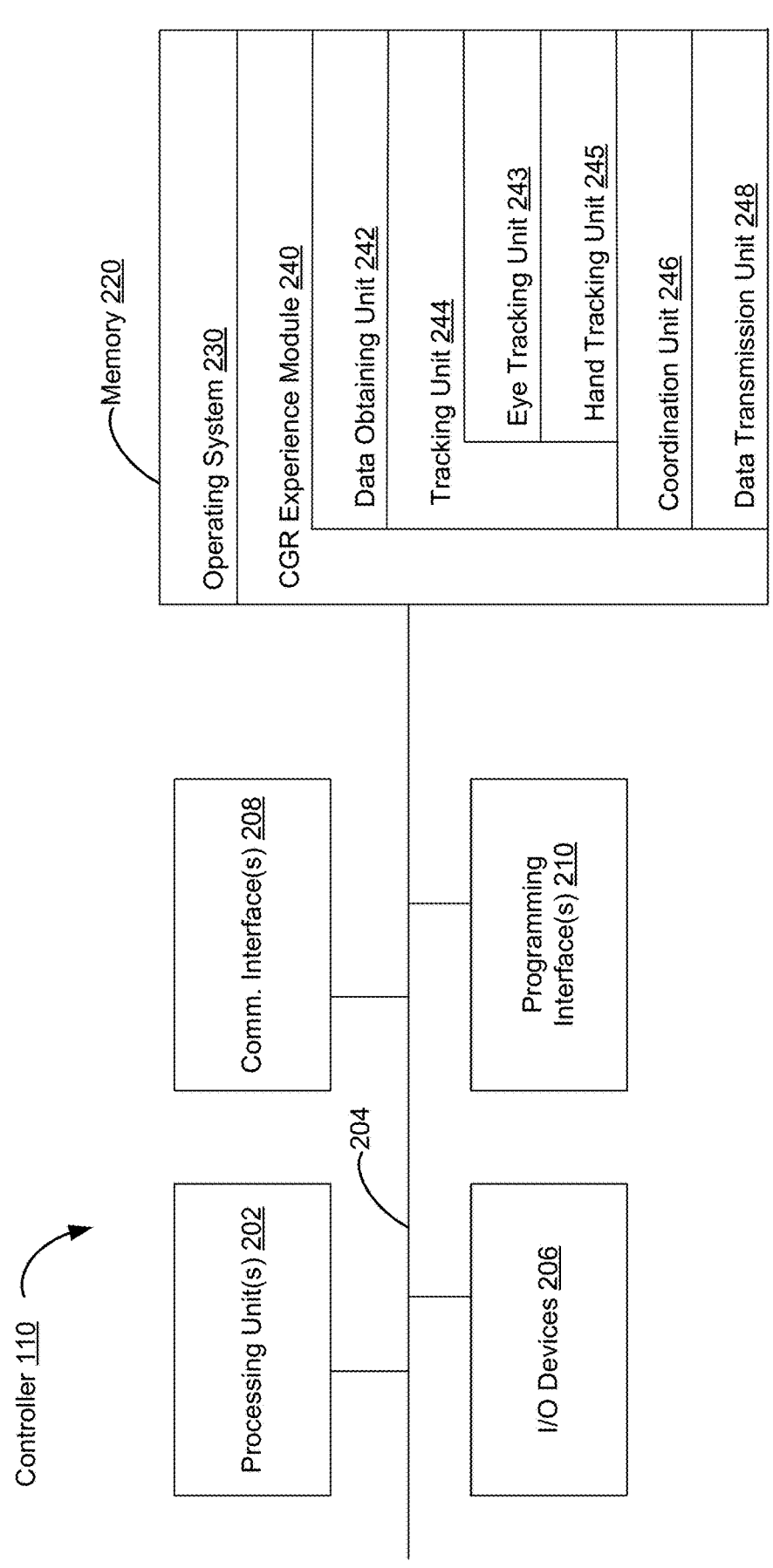
FIG. 2 is a block diagram illustrating a controller of a computer system that is configured to manage and coordinate a CGR experience for the user in accordance with some embodiments.

The present disclosure relates to user interfaces for providing a computer generated reality (CGR) experience to a user, in accordance with some embodiments.

The systems, methods, and GUIs described herein improve user interface interactions with virtual/augmented reality environments in multiple ways.

In some embodiments, a computer system provides a virtual assistant in a three-dimensional environment (e.g., augmented reality environment, augmented virtuality environment, etc.) to respond to a user's request for information and/or performance of an operation (e.g., a question, a search query, a command, etc.). When providing visual content (e.g., user interface objects, avatars, icons, visual feedback regarding performance of an operation, media content, search results, suggested applications, data items, documents, messages, images, etc.) corresponding to the requested information or performance of operation in the three-dimensional environment, the computer system displays and changes a representation of virtual illumination emanating from a position or region of the virtual assistant to direct and focus the user's attention into a portion of the three-dimensional environment at which the visual content will be displayed (e.g., by shrinking a spatial extent of a light spot of the virtual illumination on a representation of a physical surface, by transforming from general illumination to targeted illumination in the three-dimensional environment, etc.). In some embodiments, the representation of virtual illumination changes the visual appearance of the representations of physical surfaces in the three-dimensional environment to simulate illumination of the physical surfaces by a light source that is located at a location in the physical environment corresponding to the position of the virtual assistant in the three-dimensional environment. The appearance (e.g., shape, brightness, color, spatial extent, intensity distribution, movement, etc.) of the representation of the virtual illumination changes to reflect the current spatial relationship between the virtual assistant and the representations of physical surfaces in the three-dimensional environment. In some embodiments, the appearance (e.g., shape, brightness, color, spatial extent, intensity distribution, movement, etc.) of the representation of the virtual illumination also changes to reflect the current state of the virtual assistant in the processes of being activated, receiving a user input, processing the user input and preparing a response, and presenting the response to the user input, etc. In some embodiments, the virtual assistant moves into a respective portion of the three-dimensional environment that is within the field of view provided by the three-dimensional environment after the user's request for interaction (e.g., summoning the virtual assistant, asking a question, giving a command, etc.) has been received, and the computer system displays movement and changes in the representation of the virtual illumination in the currently displayed view of the three-dimensional environment to indicate the movement of the virtual assistant toward the respective portion of the three-dimensional environment, even before the virtual assistant enters the respective portion of the three-dimensional environment. In some embodiments, the virtual assistant is not embodied in a concrete virtual object (e.g., an avatar, an icon, a three-dimensional object, etc.) visible in the three-dimensional environment, and its presence in the three-dimensional environment is indicated by the changes in the virtual illumination associated with the virtual assistant. Using changing shape and appearance of the representation of virtual illumination associated with a virtual assistant to indicate a spatial relationship of the virtual assistant relative to representations of physical surfaces in the three-dimensional environment allows the presence of the virtual assistant in the three-dimensional environment to be less visually disruptive to the view of the three-dimensional environment, and provides a more realistic and integrated visual experience when the user calls on the virtual assistant while engaged in another computer-generated experience provided in the three-dimensional environment. In some embodiments, it is more advantageous to use a representation of virtual illumination that changes shape and appearance to indicate the state of the virtual assistant and/or direct the user's attention to the location at which the visual content corresponding to the user's request will be displayed than to require the user to continue to look at the virtual assistant or visually follow a small cursor or pointer generated by the virtual assistant until the visual content is displayed. Using virtual illumination as visual feedback and visual guidance for interaction with a virtual assistant, as described herein, enables the user to continue to interact with the three-dimensional environment and/or guide the virtual assistant to provide the virtual content at a position chosen by the user, without having to drag the virtual assistant or keeping an eye on the virtual assistant when searching for the suitable position in the three-dimensional environment for the visual content. As such, the disclosed methods and interfaces reduce the number, extent, and/or nature of the inputs from a user to achieve a desired outcome (e.g., interaction with the virtual assistant to obtain requested information or performance of requested operation), thereby creating a more efficient human-machine interface. It also reduces the impact of time delay and unnecessary visual interruptions, when the user invokes the virtual assistant while continuing to engage in a computer-generated experience provided by the computer system.

Figure 1:
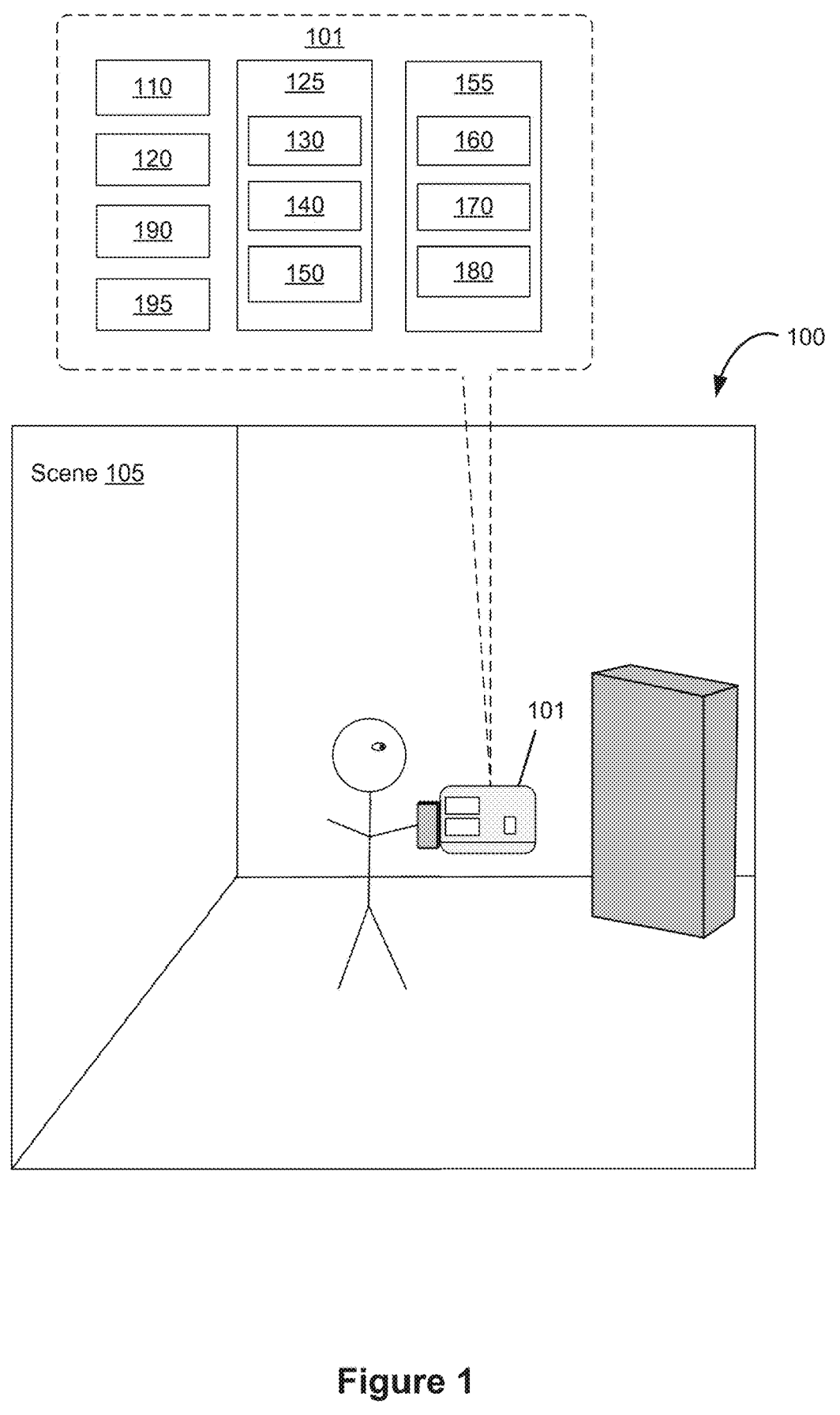

FIGS. 1-6 provide a description of example computer systems for providing CGR experiences to users. FIGS. 7A-7F are block diagrams that illustrate display and movement of virtual illumination associated with a virtual assistant in a three-dimensional environment in response to user interaction with the virtual assistant, in accordance with some embodiments. The user interfaces in FIGS. 7A-7F are used to illustrate the processes in FIG. 8.

In some embodiments, as shown in FIG. 1, the CGR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a CGR experience, various terms are used to differentially refer to several related but distinct environments that the user may sense and/or with which a user may interact (e.g., with inputs detected by a computer system 101 generating the CGR experience that cause the computer system generating the CGR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a CGR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical setting/environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the CGR experience (e.g., at least a visual component of the CGR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a CGR experience to the user while the user is virtually and/or physically present within the scene 105.

In some embodiments, the display generation component is worn on a part of the user's body (e.g., on his/her head, on his/her hand, etc.). As such, the display generation component 120 includes one or more CGR displays provided to display the CGR content. For example, in various embodiments, the display generation component 120 encloses the field-of-view of the user. In some embodiments, the display generation component 120 is a handheld device (such as a smartphone or tablet) configured to present CGR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a CGR chamber, enclosure, or room configured to present CGR content in which the user does not wear or hold the display generation component 120. Many user interfaces described with reference to one type of hardware for displaying CGR content (e.g., a handheld device or a device on a tripod) could be implemented on another type of hardware for displaying CGR content (e.g., an HMD or other wearable computing device). For example, a user interface showing interactions with CGR content triggered based on interactions that happen in a space in front of a handheld or tripod mounted device could similarly be implemented with an HMD where the interactions happen in a space in front of the HMD and the responses of the CGR content are displayed via the HMD. Similarly, a user interface showing interactions with CGR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operation environment 100 are shown in FIG. 1, those of ordinary skill in the art will appreciate from the present disclosure that various other features have not been illustrated for the sake of brevity and so as not to obscure more pertinent aspects of the example embodiments disclosed herein.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a CGR experience module 240.

The operating system 230 includes instructions for handling various basic system services and for performing hardware dependent tasks. In some embodiments, the CGR experience module 240 is configured to manage and coordinate one or more CGR experiences for one or more users (e.g., a single CGR experience for one or more users, or multiple CGR experiences for respective groups of one or more users). To that end, in various embodiments, the CGR experience module 240 includes a data obtaining unit 242, a tracking unit 244, a coordination unit 246, and a data transmitting unit 248.

In some embodiments, the data obtaining unit 242 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 242 includes instructions and/or logic therefor, and heuristics and metadata therefor.

In some embodiments, the tracking unit 244 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 244 includes instructions and/or logic therefor, and heuristics and metadata therefor. In some embodiments, the tracking unit 244 includes hand tracking unit 245 and/or eye tracking unit 243. In some embodiments, the hand tracking unit 245 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 245 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the CGR content displayed via the display generation component 120. The eye tracking unit 243 is described in greater detail below with respect to FIG. 5.

In some embodiments, the coordination unit 246 is configured to manage and coordinate the CGR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 242, the tracking unit 244 (e.g., including the eye tracking unit 243 and the hand tracking unit 245), the coordination unit 246, and the data transmitting unit 248 are shown as residing on a single device (e.g., the controller 110), it should be understood that in other embodiments, any combination of the data obtaining unit 242, the tracking unit 244 (e.g., including the eye tracking unit 243 and the hand tracking unit 245), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
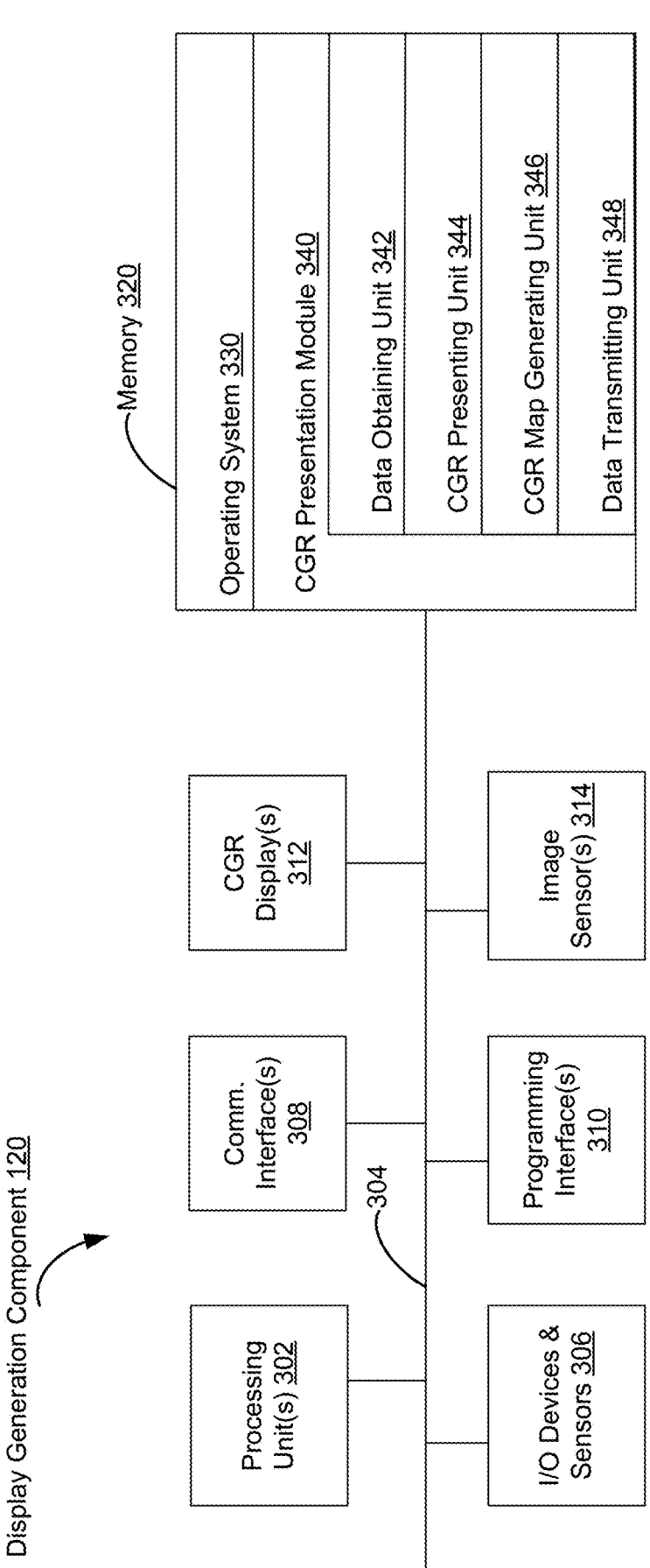
FIG. 3 is a block diagram illustrating a display generation component of a computer system that is configured to provide a visual component of the CGR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more CGR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more CGR displays 312 are configured to provide the CGR experience to the user. In some embodiments, the one or more CGR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more CGR displays 312 correspond to diffractive, reflective, polarized, holographic, etc. waveguide displays. For example, the HMD 120 includes a single CGR display. In another example, the HMD 120 includes a CGR display for each eye of the user. In some embodiments, the one or more CGR displays 312 are capable of presenting MR and VR content. In some embodiments, the one or more CGR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the HMD 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a CGR presentation module 340.

The operating system 330 includes instructions for handling various basic system services and for performing hardware dependent tasks. In some embodiments, the CGR presentation module 340 is configured to present CGR content to the user via the one or more CGR displays 312. To that end, in various embodiments, the CGR presentation module 340 includes a data obtaining unit 342, a CGR presenting unit 344, a CGR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the CGR presenting unit 344 is configured to present CGR content via the one or more CGR displays 312. To that end, in various embodiments, the CGR presenting unit 344 includes instructions and/or logic therefor, and heuristics and metadata therefor.

In some embodiments, the CGR map generating unit 346 is configured to generate a CGR map (e.g., a 3D map of the mixed reality scene or a map of the physical environment into which computer generated objects can be placed to generate the computer generated reality) based on media content data. To that end, in various embodiments, the CGR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the CGR presenting unit 344, the CGR map generating unit 346, and the data transmitting unit 348 are shown as residing on a single device (e.g., the display generation component 120 of FIG. 1), it should be understood that in other embodiments, any combination of the data obtaining unit 342, the CGR presenting unit 344, the CGR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
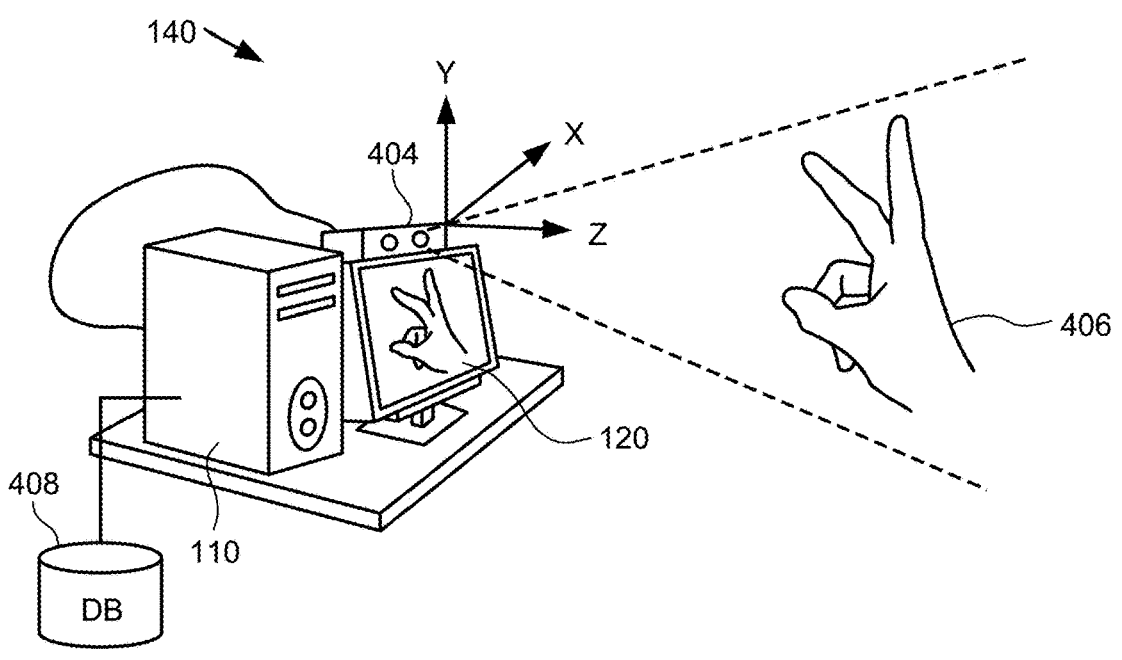
FIG. 4 is a block diagram illustrating a hand tracking unit of a computer system that is configured to capture gesture inputs of the user in accordance with some embodiments.
Figure 4:
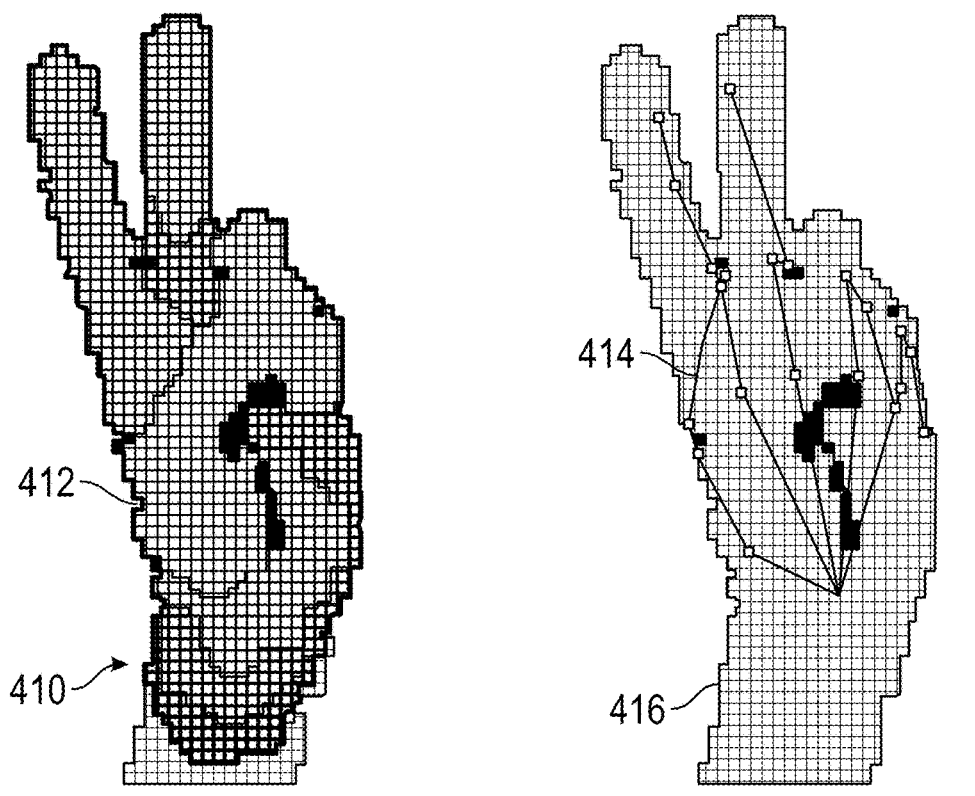

FIG. 4 is a schematic, pictorial illustration of an example embodiment of the hand tracking device 140. In some embodiments, hand tracking device 140 (FIG. 1) is controlled by hand tracking unit 245 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environment of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 outputs a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 408 and changing his hand posture.

In some embodiments, the image sensors 404 project a pattern of spots onto a scene containing the hand 406 and captures an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the hand tracking device 440 may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion and gesture information are provided via the above-mentioned API to an application program running on the controller 110. This program may, for example, move and modify images presented on the display generation component 120, or perform other functions, in response to the pose and/or gesture information.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 440, some or all of the processing functions of the controller may be performed by a suitable microprocessor and software or by dedicated circuitry within the housing of the hand tracking device 402 or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
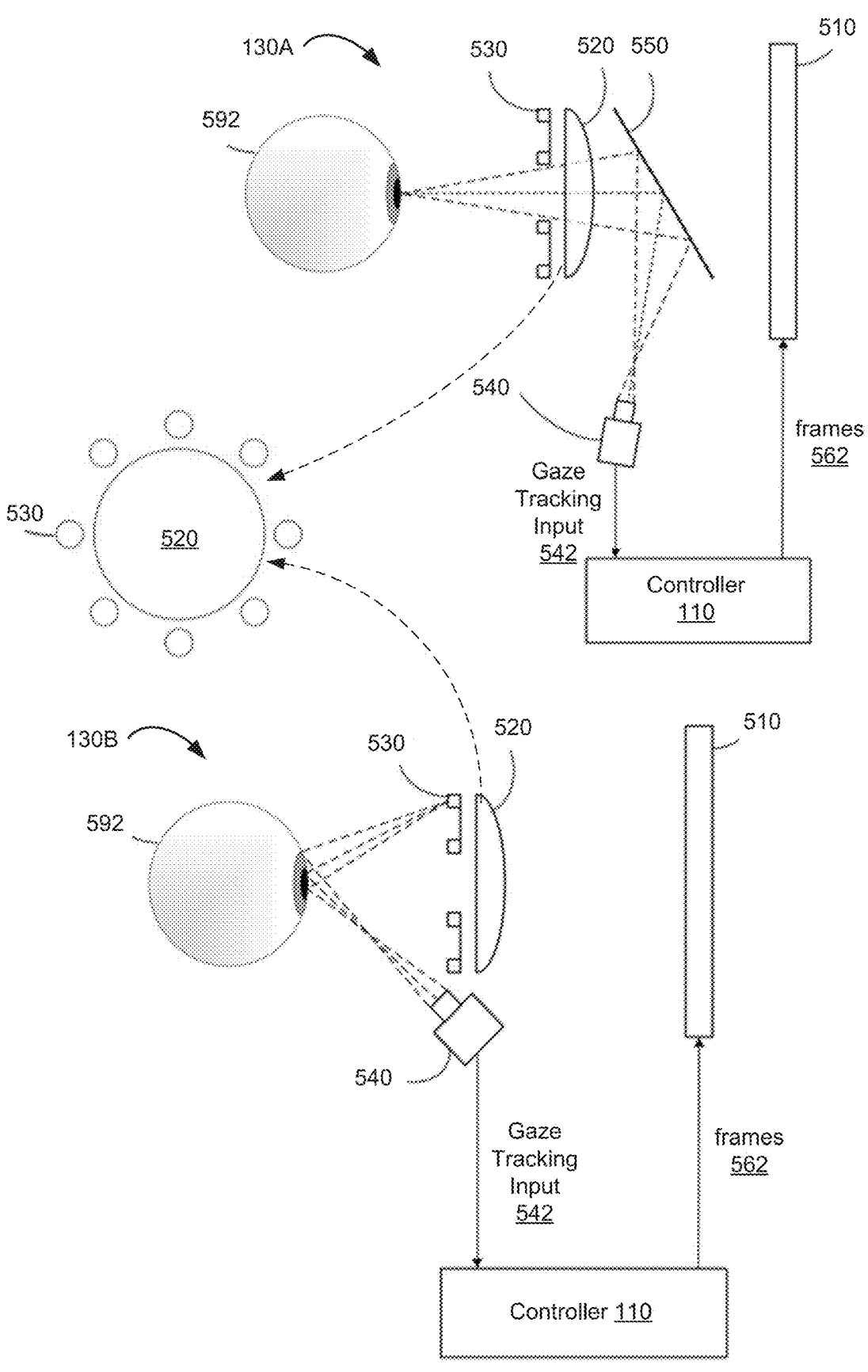
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the CGR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the CGR content for viewing by the user and a component for tracking the gaze of the user relative to the CGR content. In some embodiments, the eye tracking device 130 is separate from the display generation component 120. For example, when display generation component is a handheld device or a CGR chamber, the eye tracking device 130 is optionally a separate device from the handheld device or CGR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, a gaze tracking device 130 includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The gaze tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provide the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environment of the CGR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The Light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g. 850 nm) and a camera 540 that operates at a different wavelength (e.g. 940 nm) may be used on each side of the user's face.

Embodiments of the gaze tracking system as illustrated in FIG. 5 may, for example, be used in computer-generated reality (e.g., including virtual reality, and/or mixed reality) applications to provide computer-generated reality (e.g., including virtual reality, augmented reality, and/or augmented virtuality) experiences to the user.

Figure 6:
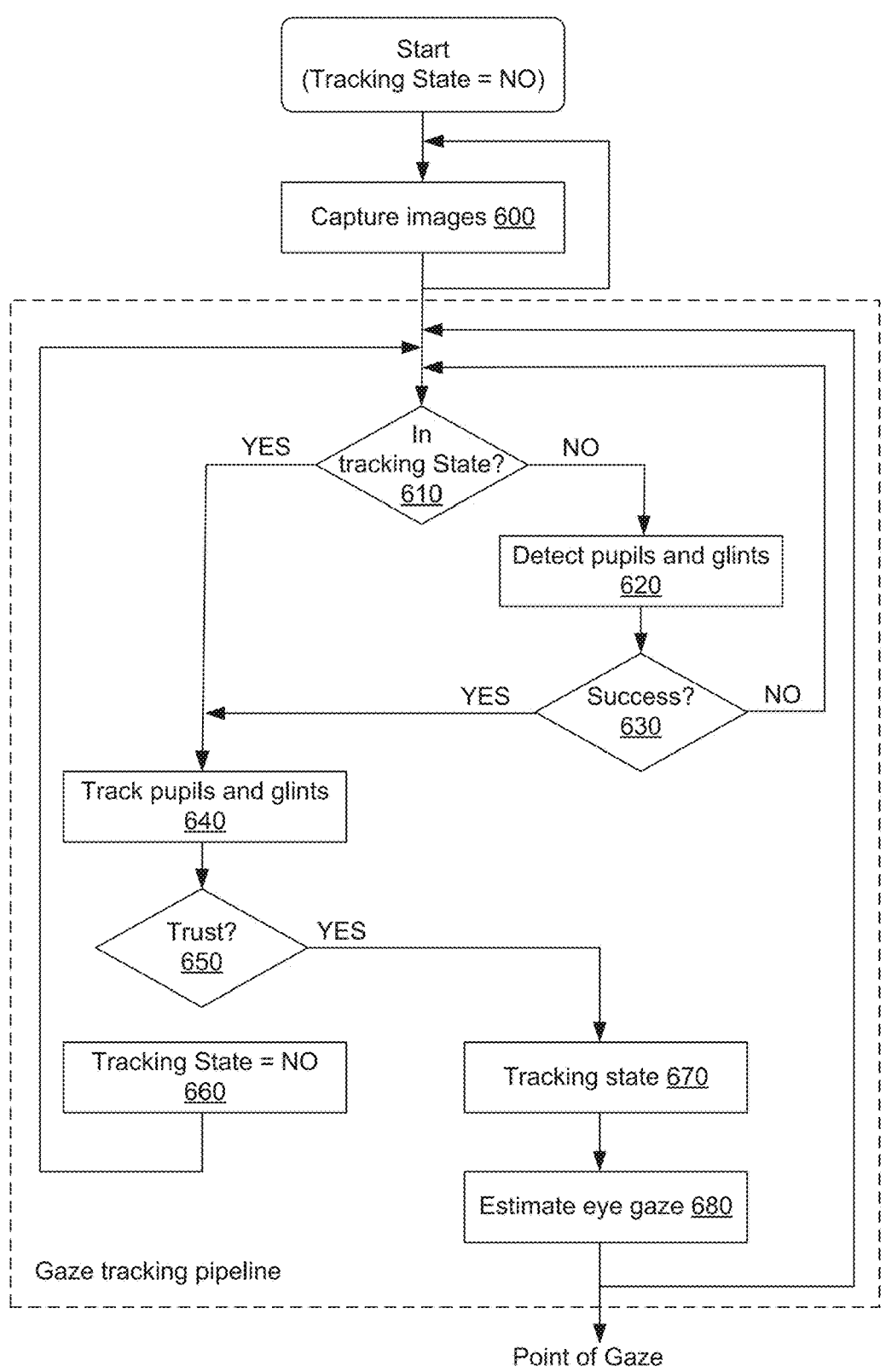
FIG. 6 is a flowchart illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracing system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 410, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serves as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing CGR experiences to users, in accordance with various embodiments.

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

FIGS. 7A-7F illustrate a three-dimensional environment displayed via a display generation component (e.g., a display generation component 7100, a display generation component 120, etc.) and interactions that occur in the three-dimensional environment caused by user inputs directed to the three-dimensional environment, in accordance with various embodiments. In some embodiments, the inputs are directed to virtual objects within the three-dimensional environment by a user's gaze detected at the positions of the virtual objects, by a hand gesture performed at a location in the physical environment that corresponds to the position of the virtual object, by a hand gesture that is performed at a location in the physical environment that is independent of the position of the virtual object while the virtual object has input focus (e.g., selected by a gaze, selected by a pointer, selected by a previous gesture input, etc.). In some embodiments, the inputs are directed to a representation of a physical object or a virtual object that corresponds to a physical object by the user's hand movement (e.g., whole hand movement, whole hand movement in a respective posture, movement of one portion of hand relative to another portion of the hand, relative movement between two hands, etc.) and/or manipulation with respect to the physical object (e.g., touching, swiping, tapping, opening, moving toward, moving relative to, etc.).

In some embodiments, the three-dimensional environment is a mixed reality environment that displays virtual objects at different virtual positions in the three-dimensional environment that are constrained by one or more physical aspects of the physical environment (e.g., positions and orientations of walls, floors, surfaces, direction of gravity, time of day, etc.). In some embodiments, the three-dimensional environment is an augmented reality environment that includes a representation of the physical environment. The representation of the physical environment includes respective representations of physical objects and surfaces at different positions in the three-dimensional environment, such that the spatial relationships between the different physical objects and surfaces in the physical environment are reflected by the spatial relationships between the representations of the physical objects and surfaces in the three-dimensional environment. When virtual objects are placed relative to the positions of the representations of physical objects and surfaces in the three-dimensional environment, they appear to have corresponding spatial relationships with the physical objects and surfaces in the physical environment.

In some embodiments, the display generation component includes a pass-through portion in which the representation of the physical environment is displayed. In some embodiments, the pass-through portion is a transparent or semi-transparent (e.g., a see-through) portion of the display generation component revealing at least a portion of physical environment surrounding and within the field of view of user. For example, the pass-through portion is a portion of a head-mounted display or heads-up display that is made semi-transparent (e.g., less than 50%, 40%, 30%, 20%, 15%, 10%, or 5% of opacity) or transparent, such that the user can see through it to view the real world surrounding the user without removing the head-mounted display or moving away from the heads-up display. In some embodiments, the pass-through portion gradually transitions from semi-transparent or transparent to fully opaque when displaying a virtual or mixed reality environment. In some embodiments, the pass-through portion of the display generation component displays a live feed of images or video of at least a portion of physical environment captured by one or more cameras (e.g., rear facing camera(s) of the mobile device or associated with the head-mounted display, or other cameras that feed image data to the electronic device). In some embodiments, the one or more cameras point at a portion of the physical environment that is directly in front of the user's eyes (e.g., behind the display generation component). In some embodiments, the one or more cameras point at a portion of the physical environment that is not directly in front of the user's eyes (e.g., in a different physical environment, or to the side or behind the user).

In some embodiments, when displaying virtual objects at positions that correspond to locations of one or more physical objects in the physical environment, at least some of the virtual objects are displayed in placed of (e.g., replacing display of) a portion of the live view (e.g., a portion of the physical environment captured in the live view) of the cameras. In some embodiments, at least some of the virtual object and content are projected onto the physical surfaces or empty space in the physical environment and are visible through the pass-through portion of the display generation component (e.g., viewable as part of the camera view of the physical environment, or through the transparent or semi-transparent portion of the display generation component, etc.). In some embodiments, at least some of the virtual objects and content are displayed to overlay a portion of the display and blocks the view of at least a portion of, but not all of, the physical environment visible through the transparent or semi-transparent portion of the display generation component. In some embodiments, at least some of the virtual objects are projected directly onto the user's retina at positions relative to an image of the representation of the physical environment (e.g., as viewed through a camera view of the physical environment, or through a transparent portion of the display generation component, etc.)

In some embodiments, the display generation component displays different views of the three-dimensional environment in accordance with user inputs or movements that changes the virtual position of the viewpoint of the currently displayed view of the three-dimensional environment relative to the three-dimensional environment. In some embodiments, movement of the user's head and/or torso, and/or the movement of the display generation component or other location sensing elements of the computer system (e.g., due to the user holding the display generation component or wearing the HMD, etc.), etc., relative to the physical environment causes corresponding movement of the viewpoint (e.g., with corresponding movement direction, movement distance, movement speed, and/or change in orientation, etc.) relative to the three-dimensional environment, resulting corresponding change in the currently displayed view of the three-dimensional environment. In some embodiments, when a virtual object has a preset spatial relationship relative to the viewpoint, movement of the viewpoint relative to the three-dimensional environment would cause movement of the virtual object relative to the three-dimensional environment while the position of the virtual object in the field of view is maintained (e.g., the virtual object is said to be head locked). In some embodiments, a virtual object is body-locked to the user, and moves relative to the three-dimensional environment when the user moves as a whole in the physical environment (e.g., carrying or wearing the display generation component and/or other location sensing component of the computer system), but will not move in the three-dimensional environment in response to the user's head movement (e.g., the display generation component and/or other location sensing component of the computer system rotating around a fixed location of the user in the physical environment).

In some embodiments, the computer-system provides a virtual assistant in the three-dimensional environment, and the position of the virtual assistant in the three-dimensional environment is locked to (e.g., has a fixed spatial relationship relative to, moves in accordance with the movement of, etc.) the viewpoint (e.g., body-locked to the user if the viewpoint is locked to the user's body, locked to the user's head if the viewpoint is locked to the user's head, locked to the display generation component if the viewpoint is locked to the display generation component, etc.) and moves relative to the three-dimensional environment when the viewpoint is moved relative to the three-dimensional environment (e.g., due to the movement of the user, due to the movement of the user's head, due to the movement of the display generation component, etc.). In some embodiments, the virtual assistant is locked to the viewpoint only when the virtual assistant is not engaged in interaction with the user, and as soon as a request for interaction is received by the virtual assistant, the virtual assistant is unlocked from the viewpoint and moves relative to its locked position in accordance with the requirement of the interaction with the user. In some embodiments, the virtual assistant is outside of the currently displayed view of the three-dimensional environment when in the locked spatial relationship relative to the viewpoint, optionally, while its virtual illumination remains visible in the currently displayed view of the three-dimensional environment. In some embodiments, the virtual assistant is invoked by the user gazing at a preset portion of the currently field of view provided by the display generation component (e.g., the peripheral portion of the field of view from which the representation of the virtual illumination emanates, a preset corner of the field of view, etc.), or providing another prescribed input (e.g., a voice command, a gesture input, etc.). In some embodiments, the virtual assistant is unlocked from the fixed spatial relationship with the viewpoint in response to a user's request to interact with the virtual assistant (e.g., a voice command summoning the virtual assistant, a query directed to the virtual assistant, a command directed to the virtual assistant, a gesture or gaze input to summon or wake the virtual assistant, etc.).

As described herein, a virtual assistant is an embodiment of a function of the computer system that assists the user in a variety of situations and tasks based on contextual information (e.g., location, time, schedule, past interactions, social contacts, currently displayed application or experience, recently accessed applications and experiences, recent interactions with the virtual assistant, etc.) and the user's request. In some embodiments, the virtual assistant has an identity that is associated with a persona, such as an animated character, a virtual animal or person, a robot, etc. In some embodiments, the inputs directed to the virtual assistant include natural language inputs and/or speech from the user, as well as other types of inputs, such as gesture, touch, controller inputs, etc. . . . In some embodiments, the responses provided by the virtual assistant includes natural language responses and/or speech, along with visual content responsive to the user's request. In some embodiments, the virtual assistant includes an artificial intelligence component that learns from past interactions with the user, or with a large number of users, to provide more accurate responses to the user.

FIGS. 7A-7F are block diagrams that illustrate display and movement of a representation of virtual illumination associated with a virtual assistant in a three-dimensional environment in response to user interaction with the virtual assistant, in accordance with some embodiments.

Figures 7A, 7B:
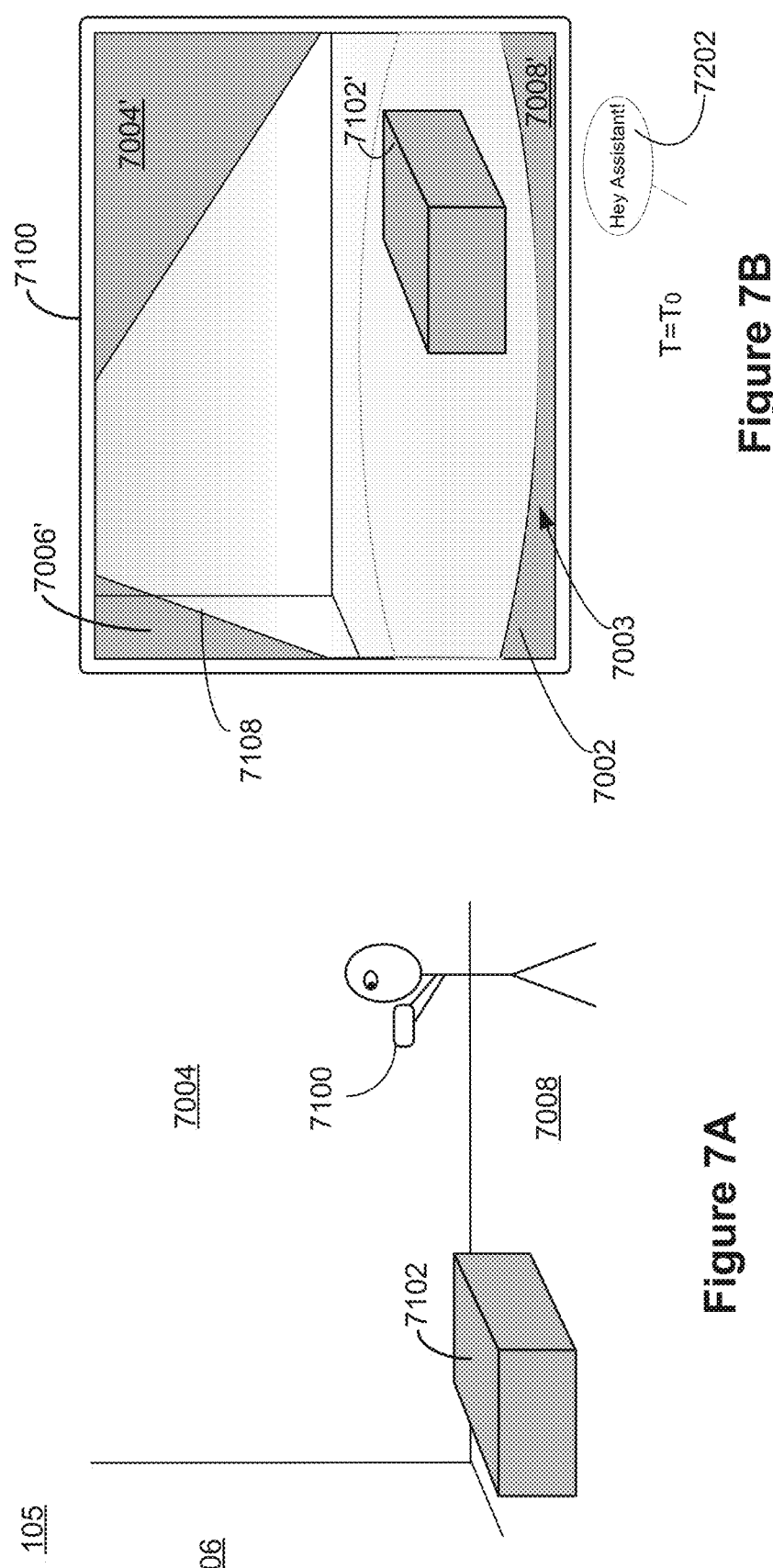
FIGS. 7A-7F are block diagrams that illustrate display and movement of a representation of virtual illumination associated with a virtual assistant in a three-dimensional environment in response to user interaction with the virtual assistant, in accordance with some embodiments.
Figures 7C, 7D:
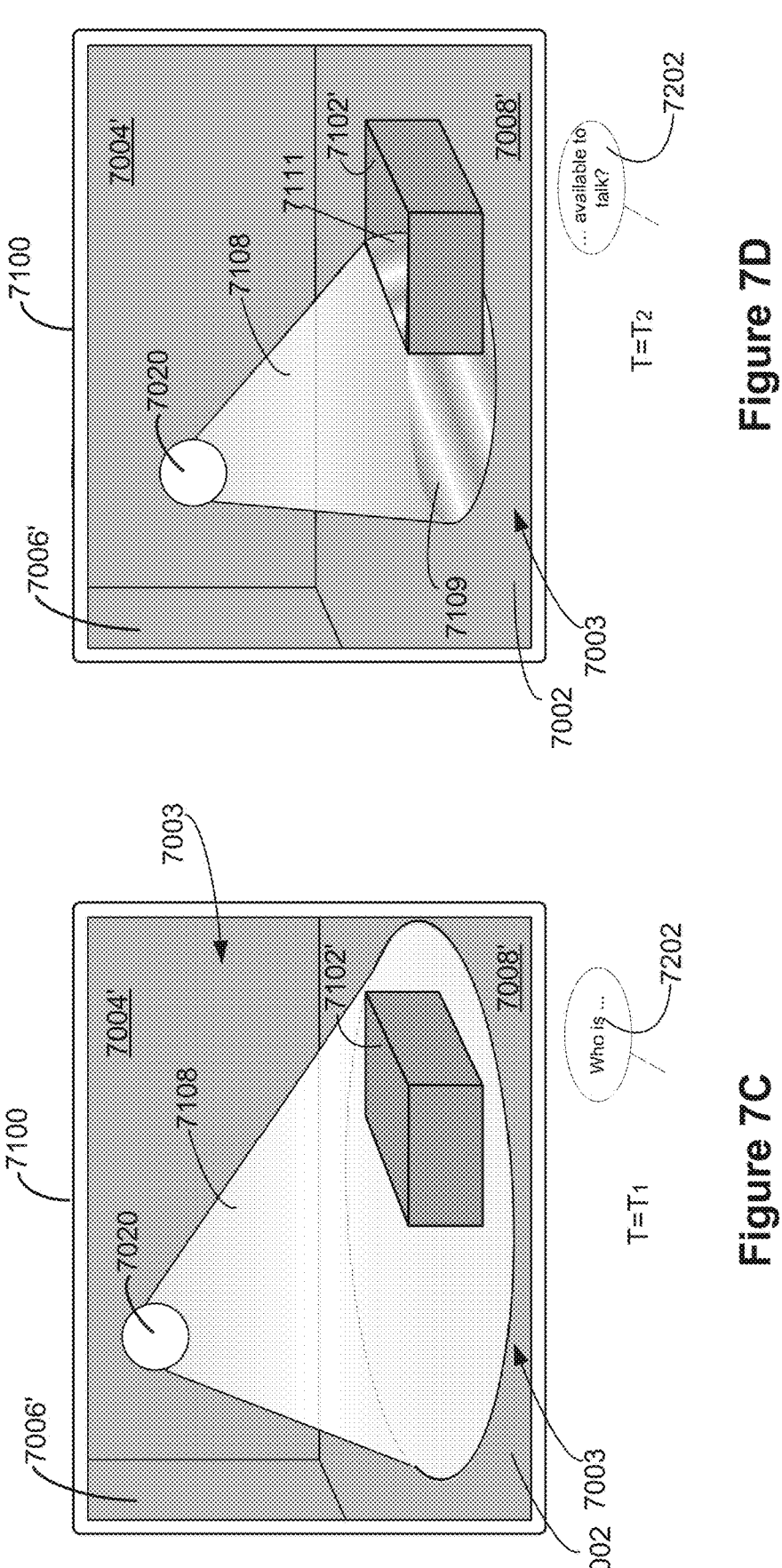

In some embodiments, a computer system provides a virtual assistant (e.g., virtual assistant 7020 in FIGS. 7C-7F, a virtual assistant without a corresponding virtual object embodiment, etc.) in a three-dimensional environment (e.g., environment 7003 in FIGS. 7B-7F, an augmented reality environment, an augmented virtuality environment, etc.) to respond to a user's request for information and/or performance of an operation (e.g., a question, a search query, a command, etc.). When providing visual content (e.g., visual content 7104 in FIG. 7F, user interface objects, avatars, icons, visual feedback regarding performance of an operation, media content, search results, suggested applications, data items, documents, messages, images, etc.) corresponding to the requested information or performance of operation in the three-dimensional environment, the computer system displays and changes a representation of virtual illumination emanating from a position or region of the virtual assistant (e.g., representations 7108 and 7110 of the virtual light emanating from the virtual assistant 7020, other representation of virtual illumination associated with a virtual assistant, etc.) to direct and focus the user's attention onto a portion of the three-dimensional environment (e.g., the top surface of the representation 7102' of the physical object 7102, representation of another physical surface or portion of physical surface, etc.) at which the visual content will be displayed (e.g., by shrinking a spatial extent of a light spot of the virtual illumination on a representation of a physical surface, by transforming from general illumination to targeted illumination in the three-dimensional environment, etc.) (e.g., as shown in the changes to the representation of the visual illumination (e.g., from representation 7108 in FIG. 7B to representation 7110 in FIG. 7E), or other changes, etc.). In some embodiments, the representation of virtual illumination changes the visual appearance of the representations of physical surfaces in the three-dimensional environment (e.g., as shown by the light spots on the representation 7008' and the top surface of the representation 7102' in FIGS. 7B-7F, etc.) to simulate illumination of the physical surfaces by a light source that is located at a location in the physical environment corresponding to the position of the virtual assistant in the three-dimensional environment. The appearance (e.g., shape, brightness, color, spatial extent, intensity distribution, movement, etc.) of the representation of the virtual illumination changes to reflect the current spatial relationship between the virtual assistant and the representations of physical surfaces in the three-dimensional environment (e.g., the changing shapes and sizes of the light cone of the representation 7108 and the light beam of the representation 7110 are based on the spatial relationship between the virtual assistant 7020 and the representation 7008' and the representation 7102' in FIGS. 7B-7F, etc.). In some embodiments, the appearance (e.g., shape, brightness, color, spatial extent, intensity distribution, movement, etc.) of the representation of the virtual illumination also changes to reflect the current state of the virtual assistant in the processes of being activated, receiving a user input, processing the user input and preparing a response, and presenting the response to the user input, etc., e.g., as illustrated by the different states of the representation of the virtual illumination in FIGS. 7B-7F. In some embodiments, the virtual assistant moves into a respective portion of the three-dimensional environment that is within the field of view provided by display generation component after the user's request for interaction (e.g., summoning the virtual assistant, asking a question, giving a command, etc.) is detected. In some embodiments, the computer system displays movement and changes in the representation of the virtual illumination in the currently displayed view of the three-dimensional environment to indicate the movement of the virtual assistant toward the respective portion of the three-dimensional environment, even before the virtual assistant enters the respective portion of the three-dimensional environment (e.g., as shown in FIGS. 7B-7C, where the virtual assistant 7020 moves into the view 7002 after the user's query 7202 is started at a time T0 when only the representation 7108 of the virtual illumination is visible in the view 7002). In some embodiments, the virtual assistant is not embodied in a concrete virtual object (e.g., an avatar, an icon, a three-dimensional object, etc.) visible in the three-dimensional environment, and its presence in the three-dimensional environment is indicated by the changes in the virtual illumination associated with the virtual assistant.

In FIG. 7A, a user and a display generation component 7100 are present in a physical environment 105. The user is in a position relative the display generation component that enables the user to view a portion of the physical environment through the display generation component. In some embodiments, the physical environment is a room or is part of a room in a building (e.g., an environment that includes one or more walls 7004 and 7006 and/or a floor 7008). In some embodiments, the physical environment is an outdoor environment (e.g., outside of a building). In some embodiments, the physical environment 105 includes one or more physical objects 7102 (e.g., an object such as a piece of furniture (e.g., a table, a chair, a cabinet, an appliance, a drawer, an electronic device, a wall, a window, a display screen, the user's hand, the user's lap, etc.), a part of the scenery (e.g., a rock, a tree, etc.), etc.) at various locations within the physical environment.

Figures 7E, 7F:
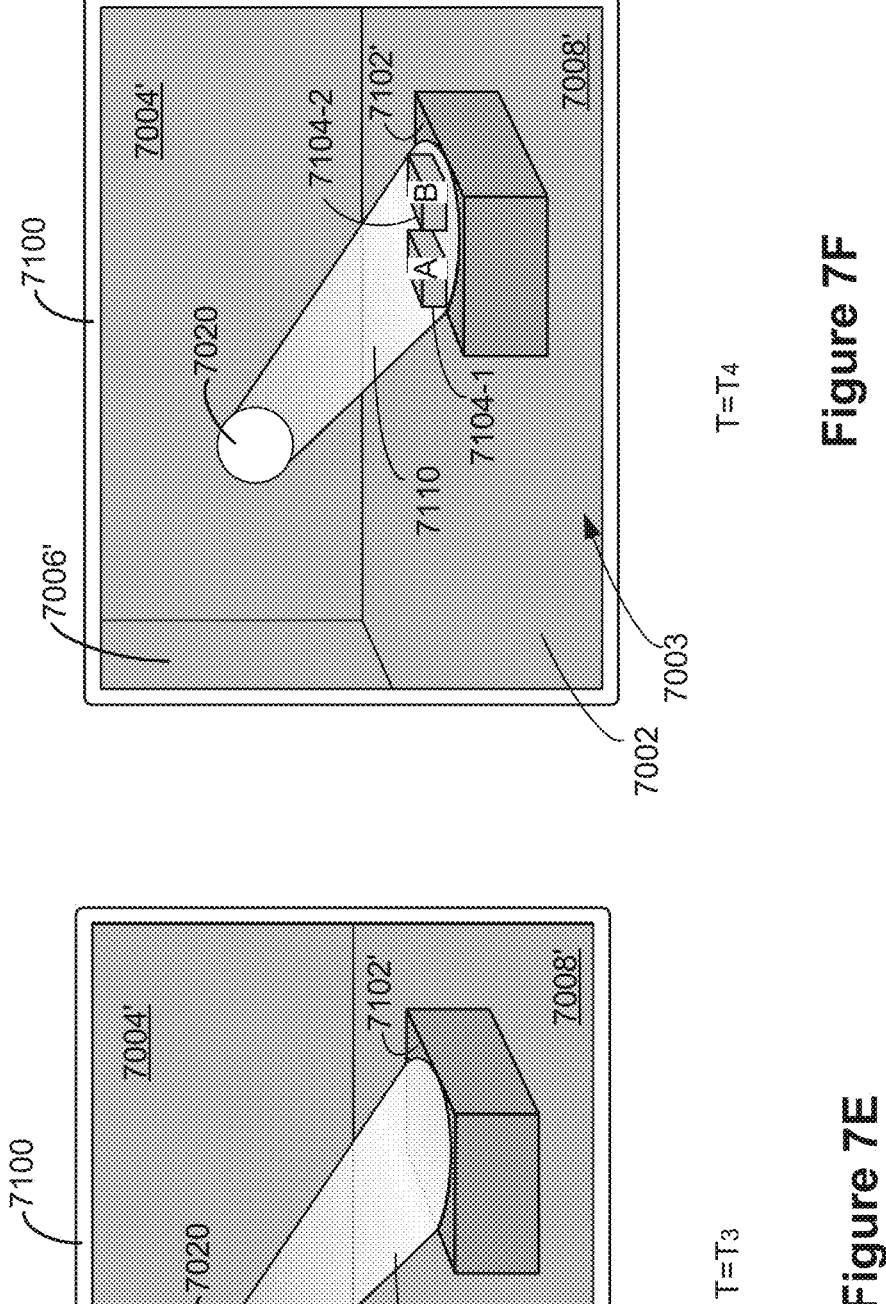

FIGS. 7B-7F illustrate animations of a representation of virtual illumination associated with the virtual assistant (e.g., in the form of different representations of the one or more projections of light, in this example) in response to user interaction (e.g., an input that corresponds to a user query received by the computer system, a voice command, etc.), in accordance with some embodiments. In this example, FIGS. 7B-7D show the changes of the representation of virtual illumination (e.g., in the form of a first representation 7108 of the one or more projections of light) before a display location of the visual content corresponding to the user's query is ascertained, and FIGS. 7E-7F show the representation of virtual illumination (e.g., in the form of a second representation 7110 of the one or more projections of light) is focused on a selected display location for the visual content (e.g., after the display location of the visual content is ascertained, before the visual content is displayed at the display location, and/or while the visual content is displayed at the selected display location, etc.) in accordance with some embodiments.

In FIG. 7B, the computer system displays a first view 7002 of a first computer-generated three-dimensional environment 7003 via a display generation component (e.g., the display generation component 7100, or another display generation component such as an HMD, etc.). FIG. 7B illustrates a state of the first view 7002 of the three-dimensional environment 7003 at a time T0 (e.g., prior to the computer system detecting a user input engaging the virtual assistant, while the virtual assistant is in a dormant state, etc.). The first view 7002 provided by the display generation component includes a representation of a portion of the physical environment 105. For example, the first view 7002 of the computer-generated three-dimensional environment includes representations of physical surfaces (e.g., such as representations 7004' and 7006' of the walls 7004 and 7006, representation 7008' and the floor 7008, etc.), and representations of physical objects (e.g., representation 7102' of the physical object 7102, representations of other physical objects, etc.) in a first portion of the physical environment.

In some embodiments, the computer system provides a virtual assistant in the three-dimensional environment 7003. In some embodiments, the position of the virtual assistant is outside of the currently displayed view of the three-dimensional environment (e.g., in a region above the portion of the three-dimensional environment that is in the field of view provided via the display generation component, in a region to the side of the portion of the three-dimensional environment that is in the field of view provided via the display generation component, etc.), and the virtual assistant is not initially visible in the currently displayed view of the three-dimensional environment before the user's request for interacting with the virtual assistant is detected. In some embodiments, the computer system detects an input from the user to wake the virtual assistant (e.g., the user moving the viewpoint to bring the position of the virtual assistant into view, the user gazing at the peripheral portion of the field of view without moving the viewpoint, the user calls on the virtual assistant via a speech input or gesture input, etc.); and in response, the computer system brings a representation of the virtual assistant into the currently displayed view of the three-dimensional environment. In some embodiments, a representation of the virtual assistant is persistently displayed in the field of view (e.g., in a manner as shown in FIG. 7C, or in a different manner from that shown in FIG. 7C, etc.) before a user's request for interaction is detected. In some embodiments, a representation of virtual illumination associated with the virtual assistant is visible in the field of view before the user's request for interaction with the virtual assistant is detected. In some embodiments, a representation of virtual illumination is displayed in the field of view in response to detecting the user's request for interaction with the virtual assistant, and optionally, before the representation of the virtual assistant is displayed or moved into the field of view provided via the display generation component.

As shown in FIG. 7B, in some embodiments, a representation of the virtual assistant is not visible in the first view 7002 of the first computer-generated three-dimensional environment (e.g., the virtual assistant is present in a position that is outside of the first view 7002, at least initially). In FIG. 7B, a representation of virtual illumination associated with the virtual assistant, e.g., in the form of a first representation 7108 of one or more projections of light, is displayed in a first portion of the three-dimensional environment 7002. In some embodiments, the first representation 7108 of the one or more projections of light has a shape and size to indicate that the virtual light is emanating from (e.g., originating at) a position or a representation of the virtual assistant 7020 that is present in the three-dimensional environment. In some embodiments, the first representation 7108 of the one or more projections of light appears to have an origin (e.g., starting position, anchor position, etc.) in a respective portion of the three-dimensional environment 7003 that is outside of that shown in the first view 7002 (e.g., the origin corresponds to the current position or region of the virtual assistant in the three-dimensional environment). For example, the narrower angle and stronger intensity and color at the top portion of the representation 7108 relative to the broader angle and weaker intensity and color at the bottom portion of the representation 7108 in FIG. 7B indicates a distance between the initial position of the virtual assistant and the representation 7008' of the floor 7008, in accordance with some embodiments. In some embodiments, the representation 7108 is not necessarily in the form of a cone of light, but in the form of soft and general illumination that does not have a well-defined boundary surface, and has variations of intensity, color, translucency, and/or other display properties, etc. to reflect the spatial relationship between the position of the virtual assistant relative to the portion of the three-dimensional environment that is in the currently displayed view of the three-dimensional environment. Similarly, the virtual assistant 7020 is, in some embodiments, represented as a shape (e.g., a two- or three-dimensional shape including but not limited to a circle, an oval, a sphere, a square, a cube, etc.), or an avatar with definable contours and outlines. In some embodiments, the representation of the virtual assistant 7020 does not have a well-defined outline or contour, and is a fuzzy region that is visually distinguished by the changing display properties of the surrounding three-dimensional environment.

In FIG. 7B, the first representation 7108 of the one or more projections of light has an appearance that indicates a spatial relationship (e.g., distance, angle, relative positions, etc.) between the virtual assistant 7020 and the first portion of the three-dimensional environment (e.g., including the representation 7008' of the floor 7008, the representation 7102' of the physical object 7102, the representations 7004' and 7006' of the walls 7004 and 7006, etc.). In some embodiments, the spatial relationship is fixed (e.g., both the virtual assistant and the viewpoint remain stationary, the virtual assistant is locked to the viewpoint, etc.). In some embodiments, the spatial relationship is variable (e.g., one or both of the virtual assistant and the viewpoint are moving and are not locked to each other, the physical objects and surfaces (e.g., moving curtains, moving hands, moving scenery, etc.) within the three-dimensional environment are moving relative to the viewpoint, etc.).

As shown in FIG. 7B, while in the initial state, the computer system detects a user input that corresponds to a request to interact with the virtual assistant (e.g., a first user input (e.g., an utterance "Hey Assistant', a gaze input at a region associated with the virtual assistant, a preset gesture input, an initial part or all of a question, an initial part of all of a voice command, etc.).

In some embodiments, in response to detecting the user input that corresponds to the request to interact with the virtual assistant (e.g., in FIG. 7B) from the user, the computer system displays the virtual assistant 7020 in the first view 7002 (e.g., the representation of the virtual assistant is moved from its original position into the field of view, the representation of the virtual assistant starts to change color and brightness to indicate that it is activated, etc.). In some embodiments, in response to detecting the user's request for interaction, the computer system displays animated changes of the first representation 7108 of the one or more projections of light in the first portion of the three-dimensional environment (e.g., animated changes as shown in FIGS. 7B-7C) to indicate that the virtual assistant is activated and is ready to receive and/or process a query from the user. For example, the animated changes include an animated representation of virtual light moving and shimmering across the representations of surfaces in the three-dimensional environment in the first portion of the three-dimensional environment, while the virtual assistant remains substantially stationary (e.g., bouncing or pulsating within a threshold range of an anchor position within the field of view, changing colors or intensity rhythmically while suspended at an anchor position in field of view, etc.) in the currently displayed view of the three-dimensional environment. In some embodiments, a representation of the virtual assistant is not displayed in the currently displayed view of the three-dimensional environment, and the animated changes in the representation of virtual light associated with the virtual assistant are used to indicate the position of the virtual assistant and the listening state of the virtual assistant.

In some embodiments, the animated changes in a respective representation 7108 of the one or more projections of light include continuous animations (e.g., continuous transitions in intensity, brightness, color, shape, spatial extent, etc.). In some embodiments, the animated changes include alterations (e.g., flickering, transient representations, rotations, etc.) of the respective representation 7108 of at least one projection of light in the one or more projections of light. In some embodiments, as shown in FIGS. 7B-7C, the animated changes in the respective representation 7108 of the one or more projections of light include continuous movement of an anchor position of representation 7108 (e.g., the narrowest point, the origin of animated movement and changes, etc.) and a reduction of the spatial extent of the representation 7108 of the one or more projections of light in the three-dimensional environment.

In some embodiments, to wake the virtual assistant (e.g., transition from an idle state to a listening state) and/or trigger a response that includes visual content from the virtual assistant (e.g., transition from a listening state to a processing state, or a responding state, etc.), the computer system requires a user input that meet various sets of criteria (e.g., first criteria for waking the virtual assistant, second criteria for making a request (e.g., asking for information or performance of an operation, etc.). In some embodiments, the virtual assistant 7020 is displayed in a respective appearance corresponding to the respective state of the virtual assistant. In some embodiments, the changes in the representation of the virtual illumination associated with the virtual assistant correspond to a respective transition between different states of the virtual assistant.

FIG. 7C illustrates that, at a time T1 later than T0 shown in FIG. 7B, the first representation 7108 of the one or more projections of light has changed to indicate the changed spatial relationship (e.g., the distance, angle, relative positions, etc.) between the virtual assistant 7020 and the first portion of the three-dimensional environment 7003 (e.g., relative to the representation 7102' of the physical object 7102, the representation 7008' of the floor 7008, etc.). In some embodiments, the representation 7108 of the one or more projections of light changes the appearances of portions of the representations of the physical surfaces that intersect (e.g., coincide in positions, in the path of, behind, etc.) with the representation 7108 of the one or more projections of light. In some embodiments, the changes in the appearances of the portions of the representations of the physical surfaces simulate optical behaviors, such as reflection, refraction, absorption, diffusion, etc. of light-matter interaction in the physical world. For example, depending on the surface properties of the physical surfaces (e.g., smoothness, material, texture, shape, angle, color, reflection index, refraction index, etc.), the computer system changes the display properties of the representations of the surfaces in different manners based on the appearance of the representation 7108 of the one or more projections of light, to reflect the surface properties of the physical surfaces. In this example, the floor 7008 is a slick surface and reflects light strongly, and the representation 7108 forms a bright light spot on the representation 7008' of the floor 7008. In contrast, the top surface of the physical object is more matted and less reflective, and the representation 7108 of the one or more projections of light does not alter the appearance of the top surface of the representation 7102' as much.

FIG. 7D illustrates that, at time T2 after the time T1 shown in FIG. 7C, detection of the user's query 7202 is completed (e.g., the user inquires who is available to talk (e.g., engage in a chat or shared experience in the three-dimensional environment), or other queries or requests, etc.). In FIG. 7D, the computer system displays animated changes of the representation 7108 of the one or more projections of light to indicate that the virtual assistant is processing the query and preparing a response (e.g., visual content and verbal answers, performing a requested operation (e.g., preparing a network connection, sending a request for a communication session with another user, etc.), etc.). FIGS. 7C and 7D illustrate an example of the animated changes in the first representation 7108 of the one or more projections of light continuing for the duration of the query 7202 directed to the virtual assistant 7020 (e.g., the animated changes continue for the entire time that the user is speaking). In some embodiments, the animated changes occur when completion of a query 7202 directed to the virtual assistant 7020 is detected by the computer system.

In FIG. 7D, while a response is being prepared and/or while the virtual assistant is waiting for the user to select a display location for displaying the visual content corresponding to a response to the query 7202, etc., the representation of the virtual assistant (e.g., representation 7020, or another representation that is within or outside of the currently displayed view, etc.) has moved closer to the representation 7102' of the physical object 7102 and the representation 7108 of the one or more projections of light is animated with movement (e.g., ripples of light waves, movement of intensity or color changes, etc.) to indicate a potential display location for the visual content corresponding to the user's query 7202. For example, the movement shown in the light spot 7109 formed on the representation 7008' of the floor 7008 and the light spot 7111 formed on the top surface of the representation 7102' of the object 7102 has a direction that points toward the center of the top surface of the representation 7102', to suggest to the user that a potential display location for the virtual content is at the center of the top surface of the representation 7102' of the object 7102.

In some embodiments, the computer system allows the user to select a suitable display location for the visual content responsive to the user's query. For example, the user may move the display generation component relative to the physical environment to move the viewpoint and bring a different portion of the physical environment into the field of view; and in response, the computer system moves the position of the virtual assistant and the representation of the virtual illumination of the virtual assistant to positions within the newly displayed portion of the three-dimensional environment. In some embodiments, the computer system detects user's input selecting a portion of the physical environment (e.g., a physical surface, a physical object, a portion of free space above or next to a physical surface, etc.) for displaying the visual content corresponding to the query; and in response, the computer system moves the virtual assistant and changes the appearance of the representation of virtual illumination of the virtual assistant to focus on the portion of the three-dimensional environment that corresponds to the location that is selected by the user's input. In some embodiments, the user's selection input is a gaze that meets preset stability and duration requirement at a position in the three-dimensional environment. In some embodiments, the user's selection input selecting a portion of the physical environment is the user's hand touching the portion of the physical environment or pointing at the portion of the physical environment. In some embodiments, the selection input is a gaze input detected in conjunction with (e.g., concurrently with, within a threshold time of, etc.) detection of the query. In some embodiments, the selection input is an input provided by another user that is sharing the three-dimensional environment with the user. In some embodiments, the computer system tracks the movement of the user's gaze to determine a location that is selected by the user's gaze. In some embodiments, the selection input includes a gesture input (e.g., touching a location, pointing at a location, tapping or pinching while the gaze is directed to a location, etc.). In some embodiments, the selected display location is the user's hand. For example, in response to detecting the user raising his/her palm toward his/her eyes in conjunction with detecting the user's query, the computer system focuses the representation 7108 of the one or more projections of light onto the representation of the user's palm, and ultimately displays the visual content at a position that corresponds to the location of the user's palm.

FIG. 7E illustrates that at a time T3 after the time T2 in FIG. 7D, the computer system has selected a display location for the visual content that correspond to the user's query 7202 (e.g., based on preset criteria, based on user's selection input, etc.), and the computer system displays a representation 7110 of the one or more projections of light that is focused on the selected display location. In FIG. 7E, the animated changes in first representation 7108 of the one or more projections of light includes transforming the first representation 7108 into a second representation 7110 of the one or more projections of light that is focused on a first sub-portion of the three-dimensional environment 7003 (e.g., the central portion of the top surface of the representation 7102' of the object 7102, another sub-portion, etc.) that is smaller than the initial area that the representation of the virtual illumination spans (e.g., as that shown in FIGS. 7B-7D). In some embodiments, the focusing of the representation 7110 of the one or more projections of light serves to draw the user's attention to the selected display location in the first sub-portion of the three-dimensional environment (e.g., the central portion of the top surface of the representation 7102' of the physical object 7102, in this example). In some embodiments, the focusing of the representation 7110 of the one or more projections of light also serves to prepare a more suitable background environment for displaying the visual content corresponding to the user's query (e.g., blurring out the top surface of the representation 7102' to make a less distracting background, making the region brighter, and/or providing a more even background to make the visual content easier to see, etc.).

FIG. 7F illustrates that at a time T4 after the time T3 shown in FIG. 7E, the computer system displays the visual content 7104 at the selected display location on the top surface of the representation 7102' of the object 7102, in accordance with some embodiments. In FIG. 7F, the second representation 7110 of the one or more projections of light remains focused at a position corresponding to selected display location in the three-dimensional environment 7003. In some embodiments, the visual content is displayed with a preset spatial relationship relative to the selected display location (e.g., parallel to, upright relative to, overlaying, etc.).

In some embodiments, when displaying the representations of the virtual assistant, the virtual illumination associated with the virtual assistant, and/or the visual content responsive to the query at positions that correspond to locations of one or more physical objects in the physical environment, representations of the virtual assistant, the virtual illumination associated with the virtual assistant, and/or the visual content responsive to the query are displayed in placed of (e.g., replacing display of) a portion of the live view (e.g., a portion of the physical environment captured in the live view) of the cameras. In some embodiments, representations of the virtual assistant, the virtual illumination associated with the virtual assistant, and/or the visual content responsive to the query are projected onto the physical surfaces or empty space in the physical environment and are visible through the pass-through portion of the display generation component (e.g., viewable as part of the camera view of the physical environment, or through the transparent or semi-transparent portion of the display generation component, etc.). In some embodiments, representations of the virtual assistant, the virtual illumination associated with the virtual assistant, and/or the visual content responsive to the query are displayed to overlay a portion of the display and blocks the view of at least a portion of, but not all of, the physical environment visible through the transparent or semi-transparent portion of the display generation component. In some embodiments, representations of the virtual assistant, the virtual illumination associated with the virtual assistant, and/or the visual content responsive to the query are projected directly onto the user's retina at positions relative to an image of the representation of the physical environment (e.g., as viewed through a camera view of the physical environment, or through a transparent portion of the display generation component, etc.). In some embodiments, the appearance of the representations of physical objects and space located behind (e.g., from the perspective of the viewpoint, from the perspective of the user, etc.) the representations of the virtual assistant, the virtual illumination associated with the virtual assistant, and/or the visual content responsive to the query are altered due to the appearance of the representations of the virtual assistant, the virtual illumination associated with the virtual assistant, and/or the visual content responsive to the query. In some embodiments, the appearance of the representations of physical objects and space intersecting with (e.g., blocking, in the path of, etc.) the representations of the virtual assistant, the virtual illumination associated with the virtual assistant, and/or the visual content responsive to the query are altered due to the appearance of the representations of the virtual assistant, the virtual illumination associated with the virtual assistant, and/or the visual content responsive to the query. In some embodiments, the appearance of the representations of physical objects and space adjacent to (e.g., above, below, next to, etc.) the representations of the virtual assistant, the virtual illumination associated with the virtual assistant, and/or the visual content responsive to the query are altered due to the appearance of the representations of the virtual assistant, the virtual illumination associated with the virtual assistant, and/or the visual content responsive to the query.

In some embodiments, the visual content 7104 includes a plurality of selectable options, a communication user interface, an interactive map, a written response, a pictorial response, a menu, a control panel, a user interface including interactive elements, a virtual menu with selectable options, a virtual list of content items, images, search results, etc., etc. that correspond to the user's query.

In some embodiments, for example, where the query 7202 corresponds to a request to interact with another user (e.g., "Hey Assistant, please find Sam." "Hey assistant, who is available to talk?", etc.), the visual content 7104 responding to the query 7202 includes respective representations of one or more users (e.g., a representation of a second user (e.g., Sam), avatars of the user's contacts that are currently online and/or available for shared experiences, etc.) other than the user of the display generation component. In some embodiments, the computer system detects a second input (e.g., a gaze input, a gesture input, a touch input, etc.) directed to the representation of a respective user (e.g., the avatar of the respective user) displayed at the selected display location. In response to detecting the second input, the computer system performs an operation to initiate a shared computer experience (e.g., a video or audio chat, etc.) between the user of the display generation component and the respective user (e.g., in the three-dimensional environment 7003, or another virtual or augmented reality environment, etc.).

In some embodiments, input gestures used in the various examples and embodiments described herein (e.g., with respect to FIGS. 7A-7F, and FIG. 8) optionally include discrete, small motion gestures performed by movement of the user's finger(s) relative to other finger(s) or part(s) of the user's hand, optionally, without requiring major movement of the user's whole hand or arm away from their natural location(s) and posture(s)) to perform operations immediately prior to or during the gesture) for interacting with a virtual or mixed-reality environment, in accordance with some embodiments.

In some embodiments, the input gestures are detected by analyzing data or signals captured by a sensor system (e.g., sensors 190, FIG. 1; image sensors 314, FIG. 3). In some embodiments, the sensor system includes one or more imaging sensors (e.g., one or more cameras such as motion RGB cameras, infrared cameras, depth cameras, etc.). For example, the one or more imaging sensors are components of or provide data to a computer system (e.g., computer system 101 in FIG. 1 (e.g., a portable electronic device 7100 or an HMD)) that includes a display generation component (e.g., display generation component 120 in FIGS. 1, 3, and 4 (e.g., a touch-screen display that serves as a display and a touch-sensitive surface, a stereoscopic display, a display with a pass-through portion, etc.). In some embodiments, the one or more imaging sensors include one or more rear-facing cameras on a side of a device opposite from a display of the device. In some embodiments, the input gestures are detected by a sensor system of a head mounted system (e.g., a VR headset that includes a stereoscopic display that provides a left image for the user's left eye and a right image for the user's right eye). For example, one or more cameras that are components of the head mounted system are mounted on the front and/or underside of the head mounted system. In some embodiments, one or more imaging sensors are located in a space in which the head mounted system is used (e.g., arrayed around head mounted system in various locations in a room) such that the imaging sensors capture images of the head mounted system and/or the user of the head mounted system. In some embodiments, the input gestures are detected by a sensor system of a heads up device (such as a heads up display, automotive windshield with the ability to display graphics, window with the ability to display graphics, lens with the ability to display graphics). For example, one or more imaging sensors are attached to interior surfaces of an automobile. In some embodiments, the sensor system includes one or more depth sensors (e.g., an array of sensors). For example, the one or more depth sensors include one or more light-based (e.g., infrared) sensors and/or one or more sound-based (e.g., ultrasonic) sensors. In some embodiments, the sensor system includes one or more signal emitters, such as a light emitter (e.g. infrared emitter) and/or sound emitter (e.g., ultrasound emitter). For example, while light (e.g., light from an array of infrared light emitters having a predetermined pattern) is projected onto a hand (e.g., hand 7200), an image of the hand under illumination of the light is captured by the one or more cameras and the captured image is analyzed to determine a position and/or configuration of the hand. Using signals from image sensors directed to the hand to determine input gestures, as opposed to using signals of touch-sensitive surfaces or other direct contact mechanism or proximity-based mechanisms allow the user to freely choose whether to execute large motions or remaining relatively stationary when providing the input gestures with his/her hand, without experiencing constraints imposed by a specific input device or input region.

In some embodiments, a tap input is, optionally, a tap input of a thumb over index finger (e.g., over a side of the index finger adjacent to the thumb) of a user's hand. In some embodiments, a tap input is detected without requiring lift-off of the thumb from the side of the index finger. In some embodiments, a tap input is detected in accordance with a determination that downward movement of the thumb are followed by upward movement of the thumb, with the thumb making contact with the side of the index finger for less than a threshold amount of time. In some embodiments, a tap-hold input is detected in accordance with a determination that the thumb moves from the raised position to the touch-down position and remains in the touch-down position for at least a first threshold amount of time (e.g., the tap time threshold or another time threshold that is longer than the tap time threshold). In some embodiments, the computer system requires that the hand as a whole remains substantially stationary in location for at least the first threshold amount of time in order to detect the tap-hold input by the thumb on the index finger. In some embodiments, the touch-hold input is detected without requiring that the hand as a whole is kept substantially stationary (e.g., the hand as a whole may move while the thumb rests on the side of the index finger). In some embodiments, a tap-hold-drag input is detected when the thumb touches down on the side of the index finger and the hand as a whole moves while the thumb rests on the side of the index finger.

In some embodiments, a flick gesture is, optionally, a push or flick input by a movement of a thumb across index finger (e.g., from the palm side to the back side of the index finger). In some embodiments, the extension movement of the thumb is accompanied by upward movement away from the side of the index finger, e.g., as in an upward flick input by the thumb. In some embodiments, the index finger moves in the opposite direction from that of the thumb during the forward and upward movement of the thumb. In some embodiments, a reverse flick input is performed by the thumb moving from an extended position to a retracted position. In some embodiments, the index finger moves in the opposite direction from that of the thumb during the backward and downward movement of the thumb.

In some embodiments, a swipe gesture is, optionally, a swipe input by a movement of a thumb along index finger (e.g., along a side of the index finger adjacent to the thumb or on the side of the palm). In some embodiments, the index finger is optionally in an extended state (e.g., substantially straight) or a curled up state. In some embodiments, the index finger moves between the extended state and the curled up state during the movement of the thumb in a swipe input gesture.

In some embodiments, different phalanges of various fingers correspond to different inputs. A tap input of thumb over various phalanges of various fingers (e.g., index finger, middle finger, ring finger, and, optionally, pinky finger) are optionally mapped to different operations. Similarly, in some embodiments, different push or click inputs can be performed by the thumb across different fingers and/or different parts of a finger to trigger different operations in a respective user interface contact. Similarly, in some embodiments, different swipe inputs performed by the thumb along different fingers and/or in different directions (e.g., toward the distal or proximal end of a finger) trigger different operations in a respective user interface context.

In some embodiments, the computer system treats tap inputs, flick inputs, and swipe inputs are treated as different types of inputs based on movement types of the thumb. In some embodiments, the computer-system treats inputs having different finger locations that are tapped, touched, or swiped by the thumb as different sub-input-types (e.g., proximal, middle, distal subtypes, or index, middle, ring, or pinky subtypes) of a given input type (e.g., a tap input type, a flick input type, a swipe input type, etc.). In some embodiments, the amount of movement performed by the moving finger (e.g., thumb) and or other movement metrics associated with the movement of the finger (e.g., speed, initial speed, ending speed, duration, direction, movement pattern, etc.) is used to quantitatively affect the operation that is triggered by the finger input.

In some embodiments, the computer-system recognizes combination input types that combines a sequence of movements by the thumb, such as a tap-swipe input (e.g., touch-down of thumb on a finger followed by swiping along the side of the finger), a tap-flick input (e.g., touch-down of thumb over a finger followed by a flick across the finger from palm side to back side of the finger), a double tap input (e.g., two consecutive taps on the side of a finger at about the same location), etc.

In some embodiments, the gesture inputs are performed by an index finger instead of the thumb (e.g., index finger performs the tap or swipe on the thumb, or the thumb and the index finger move toward each other to perform a pinch gesture, etc.). In some embodiments, a wrist movement (e.g., a flick of the wrist in a horizontal direction, or a vertical direction) is performed immediately preceding, immediately succeeding (e.g., within a threshold amount of time) or contemporaneously with the finger movement inputs to trigger additional operations, different operations, or modified operations in the current user interface context, as compared to the finger movement inputs without the modifier input by the wrist movement. In some embodiments, the finger input gestures performed with the user's palm facing the user's face are treated as a different type of gestures from finger input gestures performed with the user's palm facing away from the user's face. For example, a tap gesture performed with the user's palm facing the user performs an operation with added (or reduced) privacy safeguard as compared to an operation (e.g., the same operation) performed in response to a tap gesture performed with the user's palm facing away from the user's face.

Although one type of finger input may be used to trigger a type of operation in the examples provided in this disclosure, other types of finger input are optionally used for trigger the same type of operation in other embodiments.

Additional descriptions regarding FIGS. 7A-7F are provided below in references to method 8000 described with respect to FIG. 8 below.

FIG. 8 is a flowchart of a method 8000 of displaying and moving virtual illumination associated with a virtual assistant in a three-dimensional environment in response to user interaction with the virtual assistant, in accordance with some embodiments.

In some embodiments, the method 8000 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 8000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 8000 are, optionally, combined and/or the order of some operations is, optionally, changed.

In some embodiments, the method 8000 is performed at a computer system (e.g., computer system 101 in FIG. 1) that is in communication with a first display generation component (e.g., display generation component 120 in FIGS. 1, 3, and 4, display generation component 7100, etc.) (e.g., a heads-up display, an HMD, a display, a touchscreen, a projector, etc.), one or more audio output devices (e.g., earphones, speakers located in the physical environment, speakers within the same housing or attached to the same support structure as the first display generation component (e.g., built-in speakers of an HMD, etc.)), and one or more input devices (e.g., cameras, controllers, touch-sensitive surfaces, joysticks, buttons, gloves, watches, motion sensors, orientation sensors, etc.). In some embodiments, the first display generation component is a display component facing the user and provides a CGR experience to the user. In some embodiments, the computer system is an integrated device with one or more processors and memory enclosed in the same housing as the first display generation components, the one or more audio output devices, and at least some of the one or more input devices. In some embodiments, the computer system includes a computing component (e.g., a server, a mobile electronic device such as a smart phone or tablet device, a wearable device such as a watch, wristband, or earphones, a desktop computer, a laptop computer, etc.) that includes one or more processors and memory that is separate from one or more of the display generation components (e.g., a heads-up display, a touch-screen, a stand-alone display, etc.), the one or more output devices (e.g., earphones, external speakers, etc.) and the one or more input devices. In some embodiments, the display generation components and the one or more audio output devices are integrated and enclosed in the same housing.

In the method 8000, the computer system displays (8002), by the first display generation component a first view of a first computer-generated three-dimensional environment (e.g., the first view 7002 of the environment 7003 in FIG. 7B, a view of another environment, etc.) (e.g., the first computer-generated environment is a mixed reality environment that includes one or more virtual objects and a representation of at least a portion of a physical environment surrounding the first display generation component, or a pass-through view of a physical environment (e.g., a camera view or a view through a transparent portion of the first display generation component) that does not include any virtual content). The first view of the first computer-generated three-dimensional environment includes a representation of a respective portion of a physical environment (e.g., physical environment 105 in FIG. 7A, or another physical environment, etc.) (e.g., a portion of the physical environment that is in front of the user wearing the HMD, or holding a display generation component, etc.). The computer system also displays (8002) a first representation of one or more projections of light (e.g., a representation of a projection of light 7108 in FIG. 7B, another representation of virtual illumination associated with the virtual assistant, etc.) in a first portion of the first computer-generated three-dimensional environment (e.g., the portion of the environment 7003 that has a brighter appearance in FIG. 7B, the portion of the environment that has a changed appearance due to the virtual illumination associated with the virtual assistant, etc.). The appearance of the first representation of the one or more projections of light (e.g., the appearance of the representation of the projections of light (e.g., represented by illumination of surrounding virtual or physical environment, a light spot, simulated path of light, reflection, etc.) will change in accordance with the static or changing position, orientation, and/or appearance (e.g., color, brightness, size, shape, surface texture, transparency, etc.) of the virtual assistant in the computer-generated environment, etc.) indicates a spatial relationship (e.g., relative direction, orientation, distance, size, spatial extent, shape, etc.) between a virtual assistant present in the first computer-generated three-dimensional environment (e.g., as a virtual object within the first view or outside of the first view of the three-dimensional environment, or disembodied and not embodied in a concrete form or object) and the representation of the respective portion of the physical environment in the first computer-generated three-dimensional environment. For example, the representation of the respective portion of the physical environment has a fixed spatial relationship to the first portion of the first computer-generated three-dimensional environment, and therefore a spatial relationship to the first representation of the one or more projections of light (e.g., as the projections of light moves relative to the first portion of the first computer-generated three-dimensional environment). In the example shown in FIG. 7B, the position of the virtual assistant is above the portion of the environment 7003 that is shown by the display generation component 7100, and a little to the left of the center line of the portion of the environment 7003 shown in by the display generation component. While displaying the first view of the first computer-generated three-dimensional environment and the first representation of the one or more projections of light (e.g., the first representation of the projections of light is animated to indicate a waiting or listening state of the virtual assistant (e.g., the representation of light changes in accordance with the changes in the appearance of the virtual assistant in the waiting or listening state) where the virtual assistant is waiting for verbal input and is prepared to process the verbal input to perform one or more operations corresponding to the input such as answering query or changing an appearance of a portion of the computer-generated environment (e.g., in accordance with changes in the appearance of the virtual assistant in the waiting or listening state, or changing without requiring the presence of the virtual assistant in the current view of the three-dimensional environment, etc.)), the computer system detects (8004), from a first user, a query directed to the virtual assistant (e.g., a query 7202, another query, another user input that corresponds to an interaction that requires a response from the virtual assistant, etc.) (e.g., including detecting a voice input (e.g., "Assistant, where's the nearest library?"), a gaze input in conjunction with a voice input (e.g., "What is that?" or "Turn it on"), a gesture input for performing an operation that is associated with the virtual assistant (e.g., a gesture for invoking an operation that is not permitted in the current context, a gesture asking for help from the virtual assistant, etc.), etc.). In response to detecting (8006) the query directed to the virtual assistant, the computer system displays (8008) animated changes of the first representation of the one or more projections of light in the first portion (e.g., the first portion of the three-dimensional environment includes a representation of a physical surface (e.g., a table surface, or surface of an electronic device, etc.), a virtual object, or a representation of a physical object, etc.) of the first computer-generated three-dimensional environment (e.g., the animated changes to the representation 7108 in FIGS. 7B-7F, other animated changes, etc.), where displaying the animated changes includes displaying a second representation of the one or more projections of light (e.g., the representation 7108 or 7110 as shown in FIGS. 7C, 7D, 7E, and 7F, etc.) that is focused on a first sub-portion of the first portion of the first computer-generated three-dimensional environment (e.g., reducing a spatial extent of the representation of the light shone on a representation of a physical surface to a spotlight shone on (e.g., overlaying, blocking display of, modifying the appearance of, etc.) the representation of a sub-portion of the surface). In some embodiments, dynamic changes in the representation of the projections of light displayed at a position corresponding to (e.g., overlaying, blocking display of, modifying the appearance of, etc.) the surfaces in the three-dimensional environment persist at least from a first time before any content responding to the user query (e.g., answers to the user query, as opposed to textual transcription of the query itself) is presented in the three-dimensional environment to a second time up to or after the content responding to the user query is presented in the three-dimensional environment. In some embodiments, during the time that the projections of light are displayed, the dynamic changes in the representation of the projections of light move and focus on a representation of a portion of a surface or object represented in the three-dimensional environment on/at which the content responding to the user query will be presented, so as to guide the user's attention to the representation of that portion of the surface or object before the content is ultimately presented. In some embodiments, the animated changes are a smooth animation that transitions between the first representation and the second representation, where the first representation ceases to be displayed at the end of the animated changes. In some embodiments, the changes between the first representation and the second representation correspond to a simulation of focusing one or more beams of light on the first sub-portion of the first portion of the first computer-generated environment. After displaying the animated changes of the first representation of the one or more projections of light (and optionally, while the second representation of the one or more projections of light are focused on (e.g., overlaying, replacing display of, modifying the appearance of, etc.) the representation of the first sub-portion, less than all, of the first portion of the three-dimensional environment), the computer system displays (8010) content (e.g., virtual objects or content 7104-1 and 7104-2 in FIG. 7F, or other content, etc.) responding to the query (e.g., a plurality of selectable options, a communication user interface, an interactive map, etc.) at a position corresponding to the first sub-portion of the first portion of the first computer-generated three-dimensional environment. For example, in some embodiments, the content is displayed as a virtual object or surface that is displayed with a preset spatial relationship (e.g., substantially parallel to, substantially perpendicular to, hovering over, overlaying or replacing display of, etc.) relative to the representation of the first sub-portion of the first portion of the three-dimensional environment (e.g., a representation of a portion of a table surface, a portion of a virtual object, a representation of a portion of a physical object, etc.).

In some embodiments, while detecting the query directed to the virtual assistant (e.g., throughout at least the duration of the user query), the computer system displays continuous animation of the first representation of the one or more projections of light (e.g., indicating the listening state of the virtual assistant) (e.g., as shown in FIGS. 7C-7D, where the representation 7108 of light associated with the virtual assistant continues to change as the user utters the query), where displaying the continuous animation includes displaying alterations (e.g., flickering, transient representation, rotation, etc.) of a respective representation of at least one projection of light in the one or more projections of light at a position corresponding to a second sub-portion of the first portion of the first computer-generated three-dimensional environment. For example, in some embodiments, the continuous animations are overlaid on, replace display of, and/or modify an appearance of a virtual object or surface that is displayed with a preset spatial relationship (e.g., substantially parallel to, or substantially perpendicular to) relative to the second sub-portion of the first portion of the three-dimensional environment (e.g., a representation of a portion of a table surface, a portion of a virtual object, a representation of a portion of a physical object, etc.). In some embodiments, the second sub-portion of the first portion of the three-dimensional environment is the first sub-portion of the first portion of the three-dimensional environment. In some embodiments, the first and second sub-portions are distinct sub-portions of the first portion of the three-dimensional environment. In some embodiments, the second sub-portion is smaller than (e.g., is located within) the first sub-portion (e.g., the continuous animations take up less space in the three-dimensional environment than the first sub-portion). In some embodiments, the second sub-portion is larger than (e.g., encompasses) the first sub-portion (e.g., the continuous animations take up more space in the three-dimensional environment than the first sub-portion). Displaying the continuous animation of the first representation of the one or more projections of light, including displaying alterations of a respective representation of at least one projection of light in the one or more projections of light at a position corresponding to a second sub-portion of the first portion of the first computer-generated three-dimensional environment, provides improved visual feedback to the user (e.g., that the virtual assistant is in a listening state). Providing improved feedback enhances the operability of the device, which, additionally, reduces power usage and improves battery life of the device by enabling the user to use the device more quickly and efficiently.

In some embodiments, at least one of the first sub-portion and the second sub-portion of the first computer-generated three-dimensional environment includes a representation of a first surface (e.g., surface of physical object 7102, surface of floor 7008, etc.) in the respective portion of the physical environment. In some embodiments, displaying the continuous animation includes displaying alterations (e.g., flickering, transient representation, rotation, etc.) of the respective representation of at least one projection of light in the one or more projections of light at a position that corresponds to (e.g., overlaying, replacing display of, and/or modifying the appearance of) the representation of the first surface in the respective portion of the physical environment (e.g., as shown in FIGS. 7C-7D, the representation 7108 of the light associated with the virtual assistant continues to change in various portions of representations of the surfaces of the object 7102 and floor 7008). For example, in some embodiments, the representation of the light emanating from the representation of the virtual assistant moves and shimmers across a representation of a floor surface onto a representation of the top of a table resting on the floor, and then focuses on (e.g., reduces its spatial extent at a position that overlays, replaces display of, and/or modifies an appearance of, etc.) a portion of the representation of the table top where the virtual assistant (e.g., through the operation of the computer system) displays the answer to the user's query at the position corresponding to the representation of the top of the table within the portion of the representation of the table top on which the representation of the light was focused. Displaying the continuous animation, including displaying alterations of the respective representation of at least one projection of light in the one or more projections of light at a position that corresponds to the representation of the first surface in the respective portion of the physical environment, provides improved visual feedback to the user (e.g., that the virtual assistant is in a listening state). Providing improved feedback enhances the operability of the device, which, additionally, reduces power usage and improves battery life of the device by enabling the user to use the device more quickly and efficiently.

In some embodiments, the first sub-portion of the first computer-generated three-dimensional environment includes a representation of a second surface (e.g., a top surface of the object 7102) in the respective portion of the physical environment, and displaying the content responding to the query (e.g., a plurality of selectable options, a communication user interface, an interactive map, etc.) at the position corresponding to the first sub-portion of the first portion of the first computer-generated three-dimensional environment includes displaying the content responding to the query at a position corresponding to (e.g., overlaying, replacing display of, and/or modifying appearance of, etc.) the representation of the second surface in the respective portion of the physical environment (e.g., as shown in FIG. 7F, where the content 7104 is displayed at a position corresponding to the location of the top surface of the object 7102). For example, in some embodiments, the light appearing to emanate from the representation of the virtual assistant moves and shimmers across the representation of a room onto a representation of the top of a table or a wall, and then focuses on a portion of the representation of the table top or a portion of the representation of the wall where the virtual assistant (e.g., through the operation of the computer system) displays the answer to the user's query at a position corresponding to the top of the table or the wall within the portion of representation of the table top or wall on which the light was focused. For example, in some embodiments, the content responding to the query optionally includes three-dimensional objects that are oriented relative to the orientation of the representation of the second surface (e.g., the three-dimensional object appearing to be sitting upright on the representation of the table top, the three-dimensional object appearing to be resting with its back against the representation of the wall, the answer appearing to be scrolling along the sideways direction defined by the representation of the wall or table top, etc.). In some embodiments, the content responding to the query appears as if it were a hologram projected onto the representation of the second surface (e.g., the content appears to be raised from the plane of the representation of the second surface into the space above the plane of the representation of the second surface). Displaying the content responding to the query at a position corresponding to the representation of the second surface in the respective portion of the physical environment provides improved visual feedback to the user (e.g., by drawing attention to a distinct location where the content responding to the query will be displayed). Providing improved feedback enhances the operability of the device, which, additionally, reduces power usage and improves battery life of the device by enabling the user to use the device more quickly and efficiently.

In some embodiments, displaying the animated changes includes moving a source of the one or more projections of light (e.g., the source is a representation 7020 of the virtual assistant in the example shown in FIGS. 7C-7F) (e.g., moving the virtual assistant or a disembodied representation of the virtual assistant, etc.) in the first computer-generated three-dimensional environment toward the first sub-portion of the first portion of the first computer-generated three-dimensional environment. In some embodiments, as the source of the one or more projections of light moves toward the location where the answer to the query would be displayed, the representation of the one or more projections of light also start to focus on the location. Displaying the animated changes, including moving a source of the one or more projections of light in the first computer-generated three-dimensional environment toward the first sub-portion of the first portion of the first computer-generated three-dimensional environment, provides improved visual feedback to the user (e.g., drawing attention to the location where the answer to the query will be displayed, by moving the source of the one or more projection of light towards the location where the answer to a query will be displayed). Providing improved feedback enhances the operability of the device, which, additionally, reduces power usage and improves battery life of the device by enabling the user to use the device more quickly and efficiently.

In some embodiments, moving the source of the one or more projections of light toward the first sub-portion of the first portion of the first computer-generated three-dimensional environment includes: at a first time before detecting the query directed to the virtual assistant, displaying the first representation of the one or more projections of light without displaying a user interface object corresponding to the virtual assistant (e.g., a glowing avatar of the virtual assistant) within the first view of the first computer-generated three-dimensional environment including the representation of the respective portion of the physical environment (e.g., as shown in FIG. 7B, the representation 7020 of the virtual object is not within the view 7002 of the environment 7003, but the representation 7018 of the light associated with the virtual assistant is); and, at a second time after detecting the query directed to the virtual assistant, displaying the user interface object corresponding to the virtual assistant within the representation of the respective portion of the physical environment and displaying the first representation of the one or more projections of light extending outward from the user interface object corresponding to the virtual assistant (e.g., as shown in FIG. 7C, the representation 7020 of the virtual object is also within the view 7002 of the environment 7003, along with the representation 7018 of the light associated with the virtual assistant). In some embodiments, even though the user interface object corresponding to the virtual assistant is not visible within the first view of the first computer-generated three-dimensional environment, the presence and/or availability of the virtual assistant is hinted at with the representation of the one or more projections of light displayed near the peripheral region of the first view of the computer-generated three-dimensional environment (e.g., hinting that the user interface object will come into view from the peripheral region of the computer-generated environment). In some embodiments, the before the query is detected, other visual indications (e.g., an on/off indicator, a textual prompt, etc.) and/or a non-visual indication (e.g., music or sound effect, alert sound, etc.) of the presence and/or availability of the virtual assistant outside of the first view of the first computer-generated three-dimensional environment is, optionally, provided in addition to, or instead of, the display of the first representation of the one or more projections of light. In some embodiments, the user interface object corresponding to the virtual assistant is not visible in the displayed view of the physical environment and only the representation of the virtual light emanating from the virtual assistant is visible; and after the user interface object corresponding to the virtual assistant moves from outside of the displayed view of the physical environment to within the displayed view of the physical environment in response to the user's query, the representation of the light continues to move (e.g., changing direction and extending away from the representation of the virtual assistant) toward the location where the answer to the query will be displayed (and optionally stops at a preset distance away from that location).

Displaying the virtual assistant, at a second time after detecting the query directed to the virtual assistant, within the representation of the respective portion of the physical environment and displaying the first representation of one or more projections of light extending outward from the user interface object corresponding to the virtual assistant, after first displaying, at a first time before detecting the query directed to the virtual assistant, the first representation of one or more projection of light without displaying a user interface object corresponding to the virtual assistant, provides improved visual feedback to the user (e.g., by drawing attention to the location where the answer to the query will be displayed). Providing improved feedback enhances the operability of the device, which, additionally, reduces power usage and improves battery life of the device by enabling the user to use the device more quickly and efficiently.

In some embodiments, the computer system detects, by the one or more input devices, a first input that meets first criteria associated with identifying a location of attention of the first user providing the query (e.g., the first criteria include at least a first criterion that is met when the first input includes a gaze input or a gesture input (e.g., a pointing finger, a hand gesture, etc.) directed towards a respective object or surface in the representation of the respective portion of the physical environment shown in the first view of the first computer-generated three-dimensional environment (e.g., wherein the gaze input and gesture input meets preset stability and duration criteria while being directed towards the respective object or surface), in order for the first criteria to be met). The first sub-portion of the first portion of the first computer-generated three-dimensional environment onto which the one more projections of light is focused (and where the representation of which the content corresponding to the user query is displayed) is selected by the computer system in accordance with the first input that meets the first criteria associated with identifying the location of attention of the first user providing the query. In some embodiments, other types of input (e.g., a tap input on a touch-sensitive surface, a swipe input on a touch sensitive surface, an input on a controller or joystick, etc.) than gaze or gesture are used to focus on a respective object in the three-dimensional environment. Focusing the one or more projections of light onto the first sub-portion of the first portion of the first computer-generated three-dimensional environment in accordance with a first input that meets first criteria associated with identifying a location of attention of the first user providing the query provides improved visual feedback to the user (e.g., by providing visual feedback regarding the location of the user's attention). Providing improved feedback enhances the operability of the device, which, additionally, reduces power usage and improves battery life of the device by enabling the user to use the device more quickly and efficiently.

In some embodiments, the first input that meets the first criteria is a gaze input that is detected in conjunction with detection of the query (e.g., the gaze input and the user query are provided by the same user, and the gaze input is detected at a time that is proximate to (e.g., before, during, and/or within a threshold amount of time of) the time that the user query is detected),where the gaze input meets preset stability criteria (e.g., the location of the gaze input exhibits less than a threshold amount of movement during a threshold amount of time) at a position in the first computer-generated three-dimensional environment that corresponds to a location of a physical object or surface in the respective portion of the physical environment. Detecting a gaze input that meets preset stability criteria at a position in the first computer-generated three-dimensional environment that corresponds to a location of a physical object or surface in the respective portion of the physical environment provides additional control options without cluttering the UI with additional displayed controls (e.g., additional displayed controls for selecting the physical object or surface). Providing additional control options without cluttering the UI with additional displayed controls enhances the operability of the device, which, additionally, reduces power usage and improves battery life of the device by enabling the user to use the device more quickly and efficiently.

In some embodiments, the first input that meets the first criteria is a gesture input that is detected in conjunction with detection of the query (e.g., the gesture input and the user query are provided by the same user, and the gesture input is detected at a time that is proximate to (e.g., before, during, and/or within a threshold amount of time of) the time that the user query is detected), where the gesture input is directed to (e.g., a finger or hand points to, gesture input (e.g., air tap, pinch, etc.) detected while a gaze input is directed to the location, etc.) a position in the first computer-generated three-dimensional environment that corresponds to a location of a physical object or surface in the respective portion of the physical environment. Detecting a gesture input directed to a position in the first computer-generated three-dimensional environment that corresponds to a location of a physical object or surface in the respective portion of the physical environment, in conjunction with detecting the query, provides additional control options without cluttering the UI with additional displayed controls (e.g., additional displayed controls for selecting the physical object or surface). Providing additional control options without cluttering the UI with additional displayed controls enhances the operability of the device, which, additionally, reduces power usage and improves battery life of the device by enabling the user to use the device more quickly and efficiently.

In some embodiments, the content responding to the query includes a representation of a second user (e.g., an avatar of the second user, an indication that the second user is available for communication or a shared computer-generated experience, etc.) that is different from the first user. The computer system displays, concurrently with the representation of the second user, a first visual indication (e.g., a copresence indication, an availability indication, etc.) that the second user is available to interact with the first user (e.g., users who are currently immersed in the three-dimensional environment, and/or who have made themselves available for joining the three-dimensional environment upon request by a user of the computer system) in the first computer-generated three-dimensional environment. Displaying, concurrently with the representation of the second user, a first visual indication that the second user is available to interact with the first user in the first computer-generated three-dimensional environment, provides improved visual feedback to the first user (e.g., allowing the first user to see both the representation of the second user and the availability of the second user to interact with the first user). Providing improved feedback enhances the operability of the device, which, additionally, reduces power usage and improves battery life of the device by enabling the user to use the device more quickly and efficiently.

In some embodiments, while displaying the first visual indication in the first view of the first computer-generated three-dimensional environment, the computer system detects, by the one or more input devices, a second input (e.g., a gaze input) that is directed to the representation of the second user. In response to detecting the second input that is directed to the representation of the second user and in accordance with a determination that the second input meets second criteria (e.g., selection criteria) (e.g., wherein a gaze input meets preset stability and duration criteria while being directed towards the representation of the second user, and optionally, the gaze input is detected in conjunction with an hand gesture that meets activation criteria (e.g., an in-air tap input, a tap gesture, a pinch gesture between a finger and a portion of the hand of the finger etc.)), the computer system initiates a shared computer-generated experience between the first user and the second user (e.g., a video chat, copresence in a shared three-dimensional space, etc.). Initiating a shared computer-generated experience between the first user and the second user in response to detecting the second input that meets second criteria and is directed to the representation of the second user, provides additional control options without cluttering the UI with additional displayed controls (e.g., additional displayed controls for initiating the shared computer-generated experience). Providing additional control options without cluttering the UI with additional displayed controls enhances the operability of the device, which, additionally, reduces power usage and improves battery life of the device by enabling the user to use the device more quickly and efficiently.

In some embodiments, the computer system displays a user interface object corresponding to the virtual assistant with a respective one of a plurality of appearances (e.g., different combinations of colors, shapes, spatial extent, orientation, internal structures, brightness, etc.) in the first view of the first computer-generated three-dimensional environment, where the plurality of appearances correspond to a plurality of different states (e.g., idle state (e.g., triggered after prolonged absence of a query), activated state (e.g., triggered upon detection of a start of a query), listening state (e.g., triggered after detection of the start of the query and maintained during receiving input of the query), processing state (e.g., triggered after completion of the receiving of the query and maintained during preparing an answer for the query), answering state (e.g., triggered when displaying the answer responding to the query), etc.) of the virtual assistant in relation to a process for generating the content corresponding to the query. Displaying a user interface object corresponding to the virtual assistant with a respective one of a plurality of appearances, wherein the plurality of appearances correspond to a plurality of different states of the virtual assistant in relation to a process for generating the content corresponding to the query, provides improved visual feedback to the user (e.g., that the virtual assistant is idle, or processing a query, or providing an answer to the query, etc.). Providing improved feedback enhances the operability of the device, which, additionally, reduces power usage and improves battery life of the device by enabling the user to use the device more quickly and efficiently.

In some embodiments, in accordance with a determination that the virtual assistant has transitioned from a first state to a second state in relation to the process for generating the content corresponding to the query, where the second state is different from the first state (e.g., from idle state to activated state, from activated state or idle state to listening state, from listening state to processing state, from processing state or listening state to answer state, from answer state to idle state or listening state, etc.), the computer system displays an animated transition from displaying the user interface object corresponding to the virtual assistant with a first appearance that corresponds to the first state to displaying the user interface object with a second appearance that corresponds to the second state. The computer system displays animated changes in the first representation of one or more projections of light in accordance with changing the user interface object from the first appearance to the second appearance.

In some embodiments, the user interface object that corresponds to the virtual assistant is an illuminating shape (e.g., a spherical representation of light, a glowing ball, a glowing avatar, etc.) that changes through different states in the process of responding to a query from a user. In some embodiments, displaying the animated changes includes altering size, color, movement pattern, and/or intensity of the representation of the light that appears to be emanating from at least a portion of the representation of the virtual assistant in the three-dimensional environment. In some embodiments, when the virtual assistant is in an idle state (e.g., before the query is received), the illuminating representation of the virtual assistant has a small size and is stationary, and the representation of the virtual assistant expands in response to detecting the start of the user's query. In some embodiments, the representation of virtual assistant moves toward the user, and/or into the view of the user in response to detecting the start of the user's query. In some embodiments, during the detection of the user's query (e.g., while the user is uttering the query in speech), the computer system displays animated changes in the appearance of the virtual assistant and the representation of the light that appears to be emanating from the representation of the virtual assistant (e.g., the representations pulsate in size and bounces up and down slightly in accordance with the rhythm of the user's speech). In some embodiments, the animated change also shows an increase in size and light intensity of the representation of the virtual assistant and the representation of the light that appears to be emanating from the representation of the virtual assistant as compared to the appearance and light corresponding to the idle state of the virtual assistant (e.g., including the size and light intensity of the representation of the virtual assistant and the size and light intensity of the representation of light that appears to emanate from the representation of the virtual assistant, etc.). In some embodiments, while a user query is currently being received, the animated change of the representation of the virtual assistant includes pulsations in intensity of the representation of the light that appears to be emanating from the representation of the virtual assistant. In some embodiments, in response to and/or after receiving a user query, the animated change of the representation of the virtual assistant includes decreasing a size of a first portion (e.g., an inner portion or inner circle) of the representation of the virtual assistant (e.g., indicating that the virtual assistant is thinking about the user query).

Displaying an animated transition from displaying the user interface object corresponding to the virtual assistant with a first appearance that corresponds to a first state to displaying the user interface object with a second appearance that corresponds to a second state, and displaying animated changes in the first representation of one or more projections of light in accordance with changing the user interface object from the first appearance to the second appearance, provides improved visual feedback to the user (e.g., by emphasizing the change in state of the virtual assistant from the first state to the second state). Providing improved feedback enhances the operability of the device, which, additionally, reduces power usage and improves battery life of the device by enabling the user to use the device more quickly and efficiently.

It should be understood that the particular order in which the operations in FIG. 8 have been described is merely an example and is not intended to indicate that the described order is the only order in which the operations could be performed. One of ordinary skill in the art would recognize various ways to reorder the operations described herein. The operations described above with reference to FIG. 8 are, optionally, implemented by components depicted in FIGS. 1-6.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:

at a computing system including a first display generation component and one or more input devices:

displaying, via the first display generation component:

a first view of a first computer-generated augmented reality three-dimensional environment, wherein the first view of the first computer-generated augmented reality three-dimensional environment includes:

a representation of a respective portion of a physical environment, including an augmented reality representation of a first physical surface; and a first representation of virtual illumination in a first portion of the first computer-generated augmented reality three-dimensional environment, the first representation of the virtual illumination including a first representation of one or more projections of light in the first portion of the first computer-generated augmented reality three-dimensional environment, wherein the first representation of the one or more projections of light has an appearance that corresponds to a spatial relationship between first virtual content present in the first computer-generated augmented reality three-dimensional environment and the representation of the respective portion of the physical environment, including the first physical surface, in the first computer-generated augmented reality three-dimensional environment;

while displaying the first view of the first computer-generated augmented reality three-dimensional environment, displaying animated changes of the virtual illumination, including:

displaying changes of the first representation of the one or more projections of light in the first portion of the first computer-generated augmented reality three-dimensional environment; and displaying one or more changes within the first representation of the virtual illumination in the respective portion of the physical environment, including changing an appearance of a first portion of the augmented reality representation of the first physical surface within the first representation of the virtual illumination relative to a second portion of the augmented reality representation of the first physical surface within the first representation of the virtual illumination.

2. The method of claim 1, including:

moving the first virtual content in the first computer-generated augmented reality three-dimensional environment relative to the augmented reality representation of the first physical surface in the first computer-generated augmented reality three-dimensional environment, wherein the animated changes of the virtual illumination, including changes of the first representation of the one or more projections of light is generated in accordance with movement of the first virtual content in the first computer-generated augmented reality three-dimensional environment.

3. The method of claim 2, wherein moving the first virtual content relative to the augmented reality representation of the first physical surface in the first computer-generated augmented reality three-dimensional environment includes:

at a first time, displaying the first representation of the one or more projections of light without displaying the first virtual content within the first view of the first computer-generated augmented reality three-dimensional environment including the representation of the respective portion of the physical environment; and at a second time after the first time, displaying the first virtual content within the representation of the respective portion of the physical environment and displaying the first representation of the one or more projections of light extending outward from the first virtual content within the first view of the first computer-generated augmented reality three-dimensional environment.

4. The method of claim 1, including:

changing an appearance of the first virtual content in the first computer-generated augmented reality three-dimensional environment, wherein the animated changes of the virtual illumination, including changes of the first representation of the one or more projections of light in the first portion of the first computer-generated augmented reality three-dimensional environment is generated at least in part based on changes in the appearance of the first virtual content.

5. The method of claim 1, wherein, for at least a first period of time that the first virtual content is visible via the first display generation component, the first virtual content moves relative to the first computer-generated augmented reality three-dimensional environment in accordance with movement of a viewpoint of a user that is in a position to view content displayed via the first display generation component.

6. The method of claim 1, wherein, for at least a first period of time that the first virtual content is visible via the first display generation component, the first virtual content maintains its position in the first computer-generated augmented reality three-dimensional environment while a viewpoint of a user that is in a position to view content displayed via the first display generation component changes relative to the first computer-generated augmented reality three-dimensional environment.

7. The method of claim 1, including:

detecting a first gaze input directed to a respective portion of a current field of view provided by the first display generation component; and in response to detecting the first gaze input, and in accordance with a determination that the first gaze input meets first criteria, displaying the first virtual content in the current field of view provided by the first display generation component.

8. The method of claim 1, wherein changing the appearance of the augmented reality representation of the first physical surface in the respective portion of the physical environment is further based on one or more surface properties of the first physical surface.

9. An electronic device, comprising:

a first display generation component;

one or more input devices;

one or more processors; and memory storing one or more programs, wherein the one or more programs are configured to be executed by the one or more processors, the one or more programs including instructions for:

displaying, via the first display generation component:

a first view of a first computer-generated augmented reality three-dimensional environment, wherein the first view of the first computer-generated augmented reality three-dimensional environment includes:

a representation of a respective portion of a physical environment, including an augmented reality representation of a first physical surface; and a first representation of virtual illumination in a first portion of the first computer-generated augmented reality three-dimensional environment, the first representation of the virtual illumination including a first representation of one or more projections of light in the first portion of the first computer-generated augmented reality three-dimensional environment, wherein the first representation of the one or more projections of light has an appearance that corresponds to a spatial relationship between first virtual content present in the first computer-generated augmented reality three-dimensional environment and the representation of the respective portion of the physical environment, including the first physical surface, in the first computer-generated augmented reality three-dimensional environment;

while displaying the first view of the first computer-generated augmented reality three-dimensional environment, displaying animated changes of the virtual illumination, including:

displaying changes of the first representation of the one or more projections of light in the first portion of the first computer-generated augmented reality three-dimensional environment; and displaying one or more changes within the first representation of the virtual illumination in the respective portion of the physical environment, including changing an appearance of a first portion of the augmented reality representation of the first physical surface within the first representation of the virtual illumination relative to a second portion of the augmented reality representation of the first physical surface within the first representation of the virtual illumination.

10. A non-transitory computer readable storage medium storing one or more programs, the one or more programs comprising instructions that when executed by an electronic device comprising a first display generation component and one or more input devices, cause the electronic device to:

display, via the first display generation component:

a first view of a first computer-generated augmented reality three-dimensional environment, wherein the first view of the first computer-generated augmented reality three-dimensional environment includes:

a representation of a respective portion of a physical environment, including an augmented reality representation of a first physical surface; and a first representation of virtual illumination in a first portion of the first computer-generated augmented reality three-dimensional environment, the first representation of the virtual illumination including a first representation of one or more projections of light in the first portion of the first computer-generated augmented reality three-dimensional environment, wherein the first representation of the one or more projections of light has an appearance that corresponds to a spatial relationship between first virtual content present in the first computer-generated augmented reality three-dimensional environment and the representation of the respective portion of the physical environment, including the first physical surface, in the first computer-generated augmented reality three-dimensional environment;

while displaying the first view of the first computer-generated augmented reality three- dimensional environment, display animated changes of the virtual illumination, including:

displaying changes of the first representation of the one or more projections of light in the first portion of the first computer-generated augmented reality three-dimensional environment; and displaying one or more changes within the first representation of the virtual illumination in the respective portion of the physical environment, including changing an appearance of a first portion of the augmented reality representation of the first physical surface within the first representation of the virtual illumination relative to a second portion of the augmented reality representation of the first physical surface within the first representation of the virtual illumination.

11. The method of claim 1, wherein the representation of the respective portion of the physical environment, including the first physical surface, in the first computer-generated augmented reality three-dimensional environment, corresponds to a live feed of images or video from one or more cameras.

12. The electronic device of claim 9, the one or more programs including instructions for:

moving the first virtual content in the first computer-generated augmented reality three-dimensional environment relative to the augmented reality representation of the first physical surface in the first computer-generated augmented reality three-dimensional environment, wherein the animated changes of the virtual illumination, including changes of the first representation of the one or more projections of light is generated in accordance with movement of the first virtual content in the first computer-generated augmented reality three-dimensional environment.

13. The electronic device of claim 12, wherein moving the first virtual content relative to the augmented reality representation of the first physical surface in the first computer-generated augmented reality three-dimensional environment includes:

at a first time, displaying the first representation of the one or more projections of light without displaying the first virtual content within the first view of the first computer-generated augmented reality three-dimensional environment including the representation of the respective portion of the physical environment; and at a second time after the first time, displaying the first virtual content within the representation of the respective portion of the physical environment and displaying the first representation of the one or more projections of light extending outward from the first virtual content within the first view of the first computer-generated augmented reality three-dimensional environment.

14. The electronic device of claim 9, the one or more programs including instructions for:

changing an appearance of the first virtual content in the first computer-generated augmented reality three-dimensional environment, wherein the animated changes of the virtual illumination, including changes of the first representation of the one or more projections of light in the first portion of the first computer-generated augmented reality three-dimensional environment is generated at least in part based on changes in the appearance of the first virtual content.

15. The electronic device of claim 9, wherein, for at least a first period of time that the first virtual content is visible via the first display generation component, the first virtual content moves relative to the first computer-generated augmented reality three-dimensional environment in accordance with movement of a viewpoint of a user that is in a position to view content displayed via the first display generation component.

16. The electronic device of claim 9, wherein, for at least a first period of time that the first virtual content is visible via the first display generation component, the first virtual content maintains its position in the first computer-generated augmented reality three-dimensional environment while a viewpoint of a user that is in a position to view content displayed via the first display generation component changes relative to the first computer-generated augmented reality three-dimensional environment.

17. The electronic device of claim 9, the one or more programs including instructions for:

detecting a first gaze input directed to a respective portion of a current field of view provided by the first display generation component; and in response to detecting the first gaze input, and in accordance with a determination that the first gaze input meets first criteria, displaying the first virtual content in the current field of view provided by the first display generation component.

18. The electronic device of claim 9, wherein changing the appearance of the augmented reality representation of the first physical surface in the respective portion of the physical environment is further based on one or more surface properties of the first physical surface.

19. The electronic device of claim 9, wherein the representation of the respective portion of the physical environment, including the first physical surface, in the first computer-generated augmented reality three-dimensional environment, corresponds to a live feed of images or video from one or more cameras.

20. The non-transitory computer readable storage medium of claim 10, the one or more programs including instructions that when executed by the electronic device cause the electronic device to:

move the first virtual content in the first computer-generated augmented reality three-dimensional environment relative to the augmented reality representation of the first physical surface in the first computer-generated augmented reality three-dimensional environment, wherein the animated changes of the virtual illumination, including changes of the first representation of the one or more projections of light is generated in accordance with movement of the first virtual content in the first computer-generated augmented reality three-dimensional environment.

21. The method of claim 1, wherein displaying the one or more changes within the first representation of the virtual illumination includes displaying movement of a distribution of colors within a respective portion of the augmented reality representation of the first physical surface that intersects with the first representation of the virtual illumination in the respective portion of the physical environment.

22. The electronic device of claim 9, wherein displaying the one or more changes within the first representation of the virtual illumination includes displaying movement of a distribution of colors within a respective portion of the augmented reality representation of the first physical surface that intersects with the first representation of the virtual illumination in the respective portion of the physical environment.

23. The non-transitory computer readable storage medium of claim 20, wherein moving the first virtual content relative to the augmented reality representation of the first physical surface in the first computer-generated augmented reality three-dimensional environment includes:

at a first time, displaying the first representation of the one or more projections of light without displaying the first virtual content within the first view of the first computer-generated augmented reality three-dimensional environment including the representation of the respective portion of the physical environment; and at a second time after the first time, displaying the first virtual content within the representation of the respective portion of the physical environment and displaying the first representation of the one or more projections of light extending outward from the first virtual content within the first view of the first computer-generated augmented reality three-dimensional environment.

24. The non-transitory computer readable storage medium of claim 10, the one or more programs including instructions that when executed by the electronic device cause the electronic device to:

change an appearance of the first virtual content in the first computer-generated augmented reality three-dimensional environment, wherein the animated changes of the virtual illumination, including changes of the first representation of the one or more projections of light in the first portion of the first computer-generated augmented reality three-dimensional environment is generated at least in part based on changes in the appearance of the first virtual content.

25. The non-transitory computer readable storage medium of claim 10, wherein, for at least a first period of time that the first virtual content is visible via the first display generation component, the first virtual content moves relative to the first computer-generated augmented reality three-dimensional environment in accordance with movement of a viewpoint of a user that is in a position to view content displayed via the first display generation component.

26. The non-transitory computer readable storage medium of claim 10, wherein, for at least a first period of time that the first virtual content is visible via the first display generation component, the first virtual content maintains its position in the first computer-generated augmented reality three-dimensional environment while a viewpoint of a user that is in a position to view content displayed via the first display generation component changes relative to the first computer-generated augmented reality three-dimensional environment.

27. The non-transitory computer readable storage medium of claim 10, the one or more programs including instructions that when executed by the electronic device cause the electronic device to:

detect a first gaze input directed to a respective portion of a current field of view provided by the first display generation component; and in response to detecting the first gaze input, and in accordance with a determination that the first gaze input meets first criteria, display the first virtual content in the current field of view provided by the first display generation component.

28. The non-transitory computer readable storage medium of claim 10, wherein changing the appearance of the augmented reality representation of the first physical surface in the respective portion of the physical environment is further based on one or more surface properties of the first physical surface.

29. The non-transitory computer readable storage medium of claim 10, wherein the representation of the respective portion of the physical environment, including the first physical surface, in the first computer-generated augmented reality three-dimensional environment, corresponds to a live feed of images or video from one or more cameras.

30. The non-transitory computer readable storage medium of claim 10, wherein displaying the one or more changes within the first representation of the virtual illumination includes displaying movement of a distribution of colors within a respective portion of the augmented reality representation of the first physical surface that intersects with the first representation of the virtual illumination in the respective portion of the physical environment.

* * * * *